(12) United States Patent
Saitho et al.

(10) Patent No.: US 7,239,482 B2
(45) Date of Patent: Jul. 3, 2007

(54) THIN-FILM MAGNETIC HEAD AND NONMAGNETIC BODY FILLED CONCAVE PORTION FORMED ON A POLE LAYER AND MAGNETIC STORAGE APPARATUS USING THE SAME

(75) Inventors: Shinsaku Saitho, Tokyo (JP); Haruo Urai, Tokyo (JP); Nobuyuki Ishiwata, Tokyo (JP); Kiyotaka Shimabayashi, Tokyo (JP); Yoshihiro Nonaka, Tokyo (JP); Tamaki Toba, Tokyo (JP)

(73) Assignee: TDK Corporation (JP)

( * ) Notice: Subject to any disclaimer, the term of this patent is extended or adjusted under 35 U.S.C. 154(b) by 0 days.

(21) Appl. No.: 11/333,897

(22) Filed: Jan. 18, 2006

(65) Prior Publication Data

US 2006/0114608 A1 Jun. 1, 2006

Related U.S. Application Data

(62) Division of application No. 10/375,239, filed on Feb. 27, 2003, now Pat. No. 7,054,107, which is a division of application No. 09/317,542, filed on May 24, 1999, now Pat. No. 6,597,543.

(30) Foreign Application Priority Data

Jun. 8, 1998 (JP) .................. 10-158974

(51) Int. Cl.
*G11B 5/147* (2006.01)

(52) U.S. Cl. .................... 360/126
(58) Field of Classification Search .......... 360/126

See application file for complete search history.

(56) References Cited

U.S. PATENT DOCUMENTS

| 5,111,352 A | 5/1992 | Das et al. ............ 360/321 |
| 5,267,112 A | 11/1993 | Batra et al. .......... 360/119 |
| 5,452,164 A | 9/1995 | Cole et al. ............ 360/126 |
| 5,590,008 A | 12/1996 | Tanabe et al. .......... 360/126 |
| 5,675,461 A | 10/1997 | Aylwin et al. .......... 360/126 |
| 5,793,578 A | 8/1998 | Heim et al. ............ 360/126 |
| 5,828,533 A | 10/1998 | Ohashi et al. .......... 360/126 |
| 5,872,693 A * | 2/1999 | Yoda et al. ............ 360/126 |
| 6,091,582 A * | 7/2000 | Komuro et al. .......... 360/126 |
| 6,122,144 A | 9/2000 | Chang et al. .......... 360/122 |
| 6,172,848 B1 | 1/2001 | Santini ................ 360/126 |

FOREIGN PATENT DOCUMENTS

JP 60-10409 1/1985

(Continued)

*Primary Examiner*—A. J. Heinz
(74) *Attorney, Agent, or Firm*—Hayes Soloway P.C.

(57) ABSTRACT

A thin-film magnetic head is constituted by forming a lower shielding layer, a read gap layer holding an MR magneto-sensitive element, a common pole layer, and a write gap layer in order on an insulating substrate, forming a first flattening layer, a coil pattern layer, and a second flattening layer laminated in order on the write gap layer excluding the vicinity of an ABS plane, and forming an upper pole layer on the write gap layer and the second flattening layer nearby an ABS plane. A concave portion is formed on the common pole layer at a position separated from the ABS plane, the concave portion is filled with a nonmagnetic body, and the gap depth between the upper pole layer and the common pole layer is determined by the concave portion.

8 Claims, 18 Drawing Sheets

FOREIGN PATENT DOCUMENTS

| | | |
|---|---|---|
| JP | 60-10410 | 1/1985 |
| JP | 61-178710 | 8/1986 |
| JP | 63-58610 | 3/1988 |
| JP | 2-54412 | 2/1990 |
| JP | 2-64908 | 3/1990 |
| JP | 2-208812 | 8/1990 |
| JP | 2-302916 | 12/1990 |
| JP | 3-29104 | 2/1991 |
| JP | 3-91109 | 4/1991 |
| JP | 3-162706 | 7/1991 |
| JP | 4-157607 | 5/1992 |
| JP | 4-232606 | 8/1992 |
| JP | 4-105807 | 9/1992 |
| JP | 5-89430 | 4/1993 |
| JP | 5-143939 | 6/1993 |
| JP | 6-274836 | 9/1994 |
| JP | 9-270105 | 10/1997 |
| JP | 9305930 | 11/1997 |
| JP | 10-112006 | 4/1998 |
| JP | 11-213329 | 8/1999 |
| JP | 11-339223 | 12/1999 |

* cited by examiner

THIN-FILM MAGNETIC HEAD AND NONMAGNETIC BODY FILLED CONCAVE PORTION FORMED ON A POLE LAYER AND MAGNETIC STORAGE APPARATUS USING THE SAME

CROSS-REFERENCE TO RELATED APPLICATION

This application is a divisional of application Ser. No. 10/375,239 filed Feb. 27, 2003, now U.S. Pat. No. 7,054,107, which is a divisional of 09/317,542 filed May 24, 1999, now U.S. Pat. No. 6,597,543.

BACKGROUND OF THE INVENTION

1. Field of the Invention

The present invention relates to an inductive-type thin-film magnetic head and a magnetic storage apparatus using the magnetic head.

2. Description of the Prior Art

Recently, the recording density of a hard disk drive has been remarkably improved. A recording density after 1990 tends to rise at an annual rate of approx. 60%. To improve the recording density of a hard disk drive, it is preferable to improve the recording track density by decreasing the track width of a magnetic head. Moreover, to improve the recording density, improvement of the recording bit density is similarly important. To improve the recording bit density it is preferable to increase the resistance to applied magnetic force(Hc) of a magnetic storage medium. Moreover, to write data in a magnetic storage medium having a high Hc, it is preferable to use an inductive recording head having a high recording capacity. Furthermore, to efficiently detect a signal from micro-scaled recording bits, it is preferable to use an MR reproducing head. Therefore, an MR-inductive composite-type thin-film magnetic head obtained by combining an MR reproducing head with an inductive recording head is prospective for high-density recording.

FIG. 19 is a sectional view of a conventional thin-film magnetic head. The conventional thin-film magnetic head will be hereafter described by referring to FIG. 19.

A conventional thin-film magnetic head 70 is constituted by laminating a lower shielding layer 74, a read gap layer 80 holding an MR magnetosensitive element 78 in an ABS plane 76, a common pole layer 82 serving as an upper shielding layer and a lower pole layer, and a write gap layer 84 in order on an insulating substrate 72, then laminating a first flattening layer 86, a coil pattern layer 88, and a second flattening layer 90 in order on the write gap layer 84 excluding the vicinity of the ABS plane 76, and by laminating an upper pole layer 92 on the write gap layer 84, first flattening layer 86, and second flattening 90 nearby the ABS plane 76.

The common pole layer 82 serves as an upper shielding layer for improving the reproducing resolution of an MR reproducing head and a lower pole layer of an inductive recording head. The MR magnetosensitive element 78 detects a signal magnetic field from a not-illustrated magnetic storage medium facing the ABS plane 76. The thickness of the write gap layer 84 serves as the gap of the inductive recording head. The first flattening layer 86 serves as the insulating base of the coil pattern layer 88 and the second flattening layer 90 corrects the irregular height difference in the coil pattern layer 88. The portion free from the first flattening layer 86 on the write gap layer 84 nearby the ABS plane 76 specifies the gap depth D of the inductive recording head. The recording track width is determined by the front end portion width W (not illustrated) of the upper pole layer 92. The front end portion width W represents the width of the upper pole layer 92 on the ABS plane (front end) in the direction vertical to a drawing surface, which is illustrated in FIG. 2 and the like.

To improve the recording capacity under high-density recording, it is preferable to decrease the gap depth D to 1 μm or less. Moreover, to correspond to high-density recording, it is preferable to realize the upper pole layer 92 having a minimum front end portion width W.

Furthermore, an invention for improving the recording density is disclosed in the official gazette of Japanese Patent Application Laid-Open No. 9-305930. This invention attains its object by using a magnetic recording/reproducing head configured by superimposing a sealed-type MR head on an inductive-type magnetic recording head and thereby, improving the accuracy of widths of the recording coil and recording track of an upper recording head.

BRIEF SUMMARY OF THE INVENTION

Object of the Invention

To form a necessary gap depth D, it is preferable to form the first flattening layer 86 considerably nearing the ABS plane 76 side, determining the gap depth D. Therefore, the conventional thin-film magnetic head 70 has the following problem when forming a resist frame pattern (not illustrated) for forming the upper pole layer 92 through the frame plating method.

The first flattening layer 86, coil pattern layer 88, and the second flattening layer 90 are successively superimposed and then, a resist frame pattern is formed. In this case, a large height difference is formed between the write gap layer 84 and the second flattening layer 90 at the front end portion. Therefore, the thickness of the resist film of the resist frame pattern at the front end portion reaches 10 μm or more. Moreover, the front end of the first flattening layer 86 is formed into a curved surface. Therefore, when light for exposure reflects on the curved surface, the resist frame pattern could easily be overexposed.

Thus, the resist frame pattern for forming the front end portion of the upper pole layer 92 tends to have a large film thickness and it is easily overexposed. Therefore, obtaining a necessary gap depth D makes it difficult to obtain a necessary front-end portion width W.

SUMMARY OF THE INVENTION

Therefore, it is an object of the present invention to provide a thin-film magnetic head capable of accurately decreasing a gap depth D and a front-end portion width W and a magnetic storage apparatus using the magnetic head.

The thin-film magnetic head in claim 1 of the present invention is constituted by laminating a write gap layer on a lower pole layer, forming a first flattening layer, a coil pattern layer, and a second flattening layer in order on the write gap layer excluding an ABS plane, and forming an upper pole layer on the write gap layer at least at near the ABS plane. Moreover, a concave portion is formed on the lower pole layer at a position separated from the ABS plane, the concave portion is filled with a non magnetic body, and the gap depth between the upper pole layer and the lower pole layer is determined by the concave portion.

The gap depth is not determined by the distance from the ABS plane to the front end of the first flattening layer but it is determined by the distance from the ABS plane to the margin of the concave portion. Since the concave portion is formed on a flat lower pole layer, no problem occurs in the photolithography process for forming the concave portion. Moreover, the resist frame pattern for forming the front end portion of the upper pole layer is not increased in film thickness nor is it overexposed because the first flattening layer can be sufficiently separated from the ABS plane.

The thin-film magnetic head in claim 2 of the present invention is constituted by laminating a lower shielding layer, a read gap layer holding an MR magnetosensitive element in an ABS plane, a common pole layer serving as an upper shielding layer and a lower pole layer, and a write gap layer in order on an insulating substrate, then laminating a first flattening layer, a coil pattern layer, and a second flattening layer in order on the write gap layer excluding the vicinity of the ABS plane, and then forming at least an upper pole layer on the write gap layer nearby the ABS plane. Moreover, a concave portion is formed on the common pole layer at a position separated from the ABS plane, the concave portion is filled with a nonmagnetic body, and the gap depth between the upper pole layer and the lower pole layer is determined by the concave portion. That is, the thin-film magnetic head in claim 2 is an MR-inductive composite-type thin-film magnetic head obtained by combining an MR reproducing head with an inductive recording head.

The thin-film magnetic heads of claims 3 to 29 are constituted by restricting some components of the thin-film magnetic head of claim 1 or 2. The magnetic storage apparatus of claim 14 uses the thin-film magnetic head in claim 1 or 2.

DETAILED DESCRIPTION OF THE PREFERRED EMBODIMENTS

Embodiments of the present invention will be described below by referring to the accompanying drawings. In every drawing, however, the same portion is provided with the same symbol and thereby, duplicate description is omitted.

Figure 1:
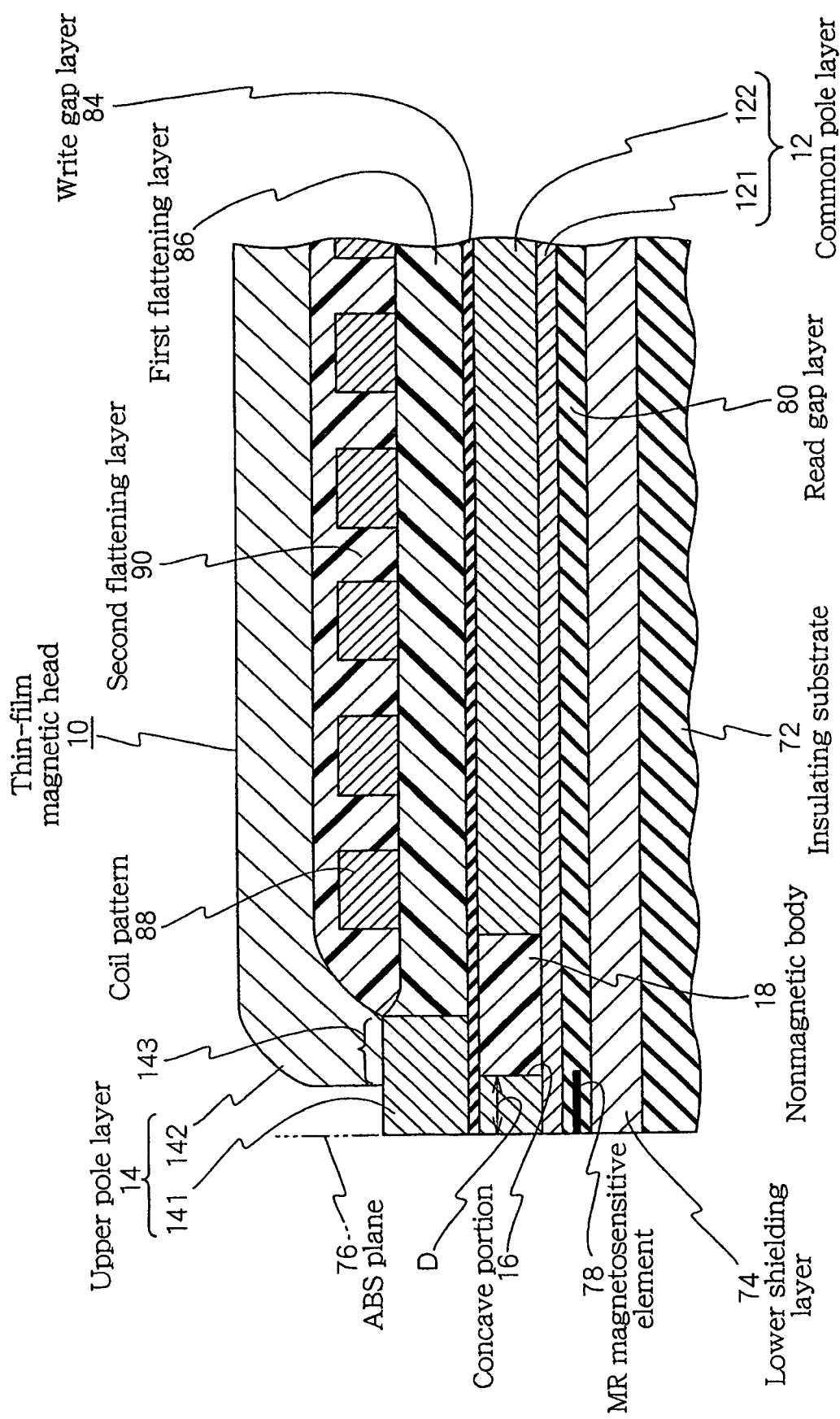
FIG. 1 is a longitudinal sectional view along the line I—I of FIG. 2, showing a first embodiment (basic configuration) of a thin-film magnetic head of the present invention.
Figure 2:
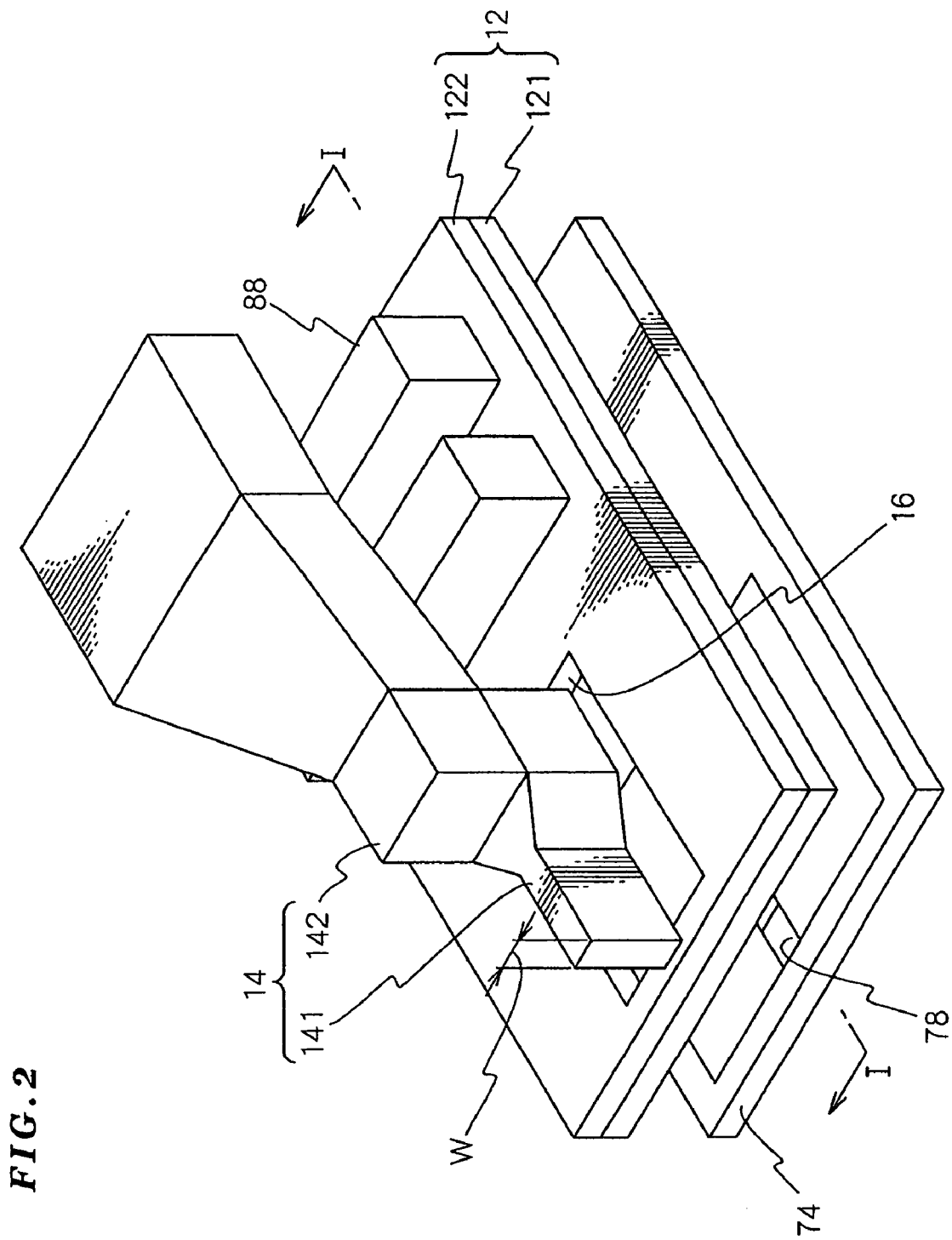
FIG. 2 is a partially-omitted perspective view showing the thin-film magnetic head shown in FIG. 1.

FIGS. 1 and 2 show the first embodiment (basic configuration) of a thin-film magnetic head of the present invention, in which FIG. 1 is a longitudinal sectional view of the first embodiment 1, taken along the line I—I of FIG. 2 and FIG. 2 is a partially-omitted perspective view of the first embodiment. The first embodiment will be described below by referring to FIGS. 1 and 2.

A thin-film magnetic head 10 of this embodiment is constituted by laminating a lower shielding layer 74, a read gap layer 80 holding an MR magnetosensitive element 78 in an ABS plane 76, a common pole layer 12 serving as an upper shielding layer and a lower pole layer, and a write gap layer 84 in order on an insulting substrate 72, then laminating a first flattening layer 86, a coil pattern layer 88, and a second flattening layer 90 in order on the write gap layer 84 excluding the vicinity of the ABS plane 76, and forming an upper pole layer 14 on the write gap layer 84 nearby the ABS plane 76 and the second flattening layer 90. Moreover, a concave portion 16 is formed on the common pole layer 12 at a position separated from the ABS plane 76, the concave portion 16 is filled with a nonmagnetic body 18, and the gap depth D between the upper pole layer 14 and the common pole layer 12 is determined by the concave portion 16. The gap depth D is shown in FIG. 1 and the front-end portion width W is shown in FIG. 2.

An MR reproducing head is configured of the MR magnetosensitive element 78, lower shielding layer 74, read gap layer 80, and common pole layer 12 serving as an upper shielding layer. An inductive recording head is constituted of the common pole layer 12 serving as a lower pole layer, write gap layer 84, first flattening layer 86, coil pattern layer 88, second flattening layer 90, and upper pole layer 14. The common pole layer 12 is configured of a lower common pole layer 121 and an upper common pole layer 122 and a part of the upper common pole layer 122 passes to form the concave portion 16. The upper pole layer 14 is configured of a front end portion 141 facing the ABS plane 76 and a yoke portion 142 connecting with the front end portion 141. The front end portion 141 and yoke portion 142 are connected with each other through a joint 143. The nonmagnetic body 18 made of resist is flatly embedded in the concave portion 16. The surface of the common pole layer 122 and that of the nonmagnetic body 18 are flush. The front end portion 141 and the common pole layer 12 use a high-Bs material having a saturation flux density (Bs) of 1.4 to 2.1 T.

The gap depth D is not determined by the distance from the ABS plane 76 up to the front end of the first flattening layer 86 but by the distance from the ABS plane 76 up to the margin of the concave portion 16. The concave portion 16 is formed on the common pole layer 12 serving as a flat lower pole layer. Therefore, no problem occurs in the photolithography process for forming the concave portion 16. Moreover, because a resist frame pattern (not illustrated) for forming the front end portion 141 is formed on a flat plane before forming the first flattening layer 86, no problem occurs in the photolithography process and thus, it is possible to accurately decrease the width of the front end portion 141.

Figure 3:
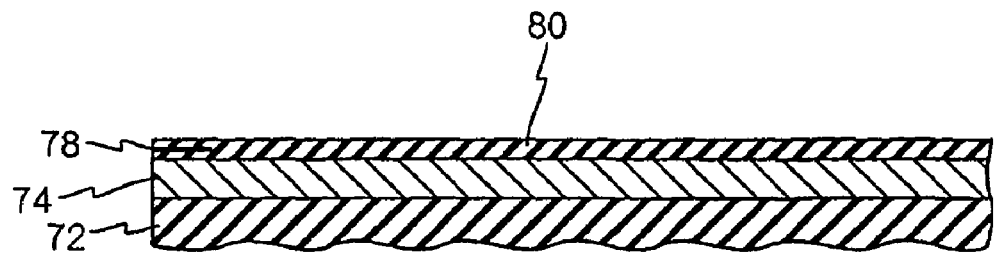
FIG. 3(*a*) to FIG. 3(*c*) are sectional views showing a method for producing the thin-film magnetic head shown in FIG. 1, in which processes advance from FIG. 3(*a*), 3(*b*), to 3(*c*) in order.
Figure 3:
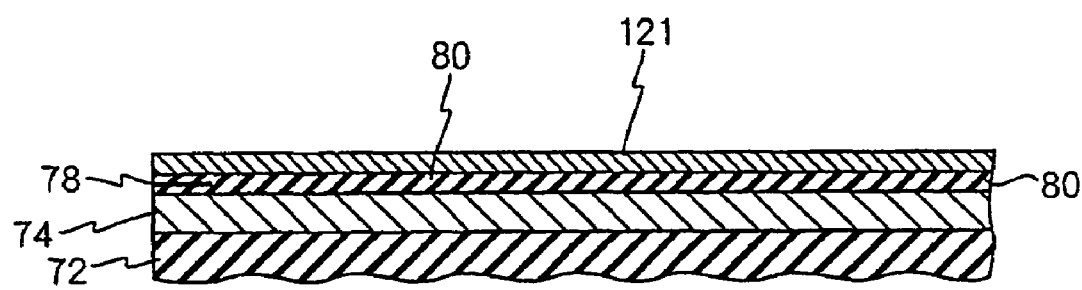
Figure 3:
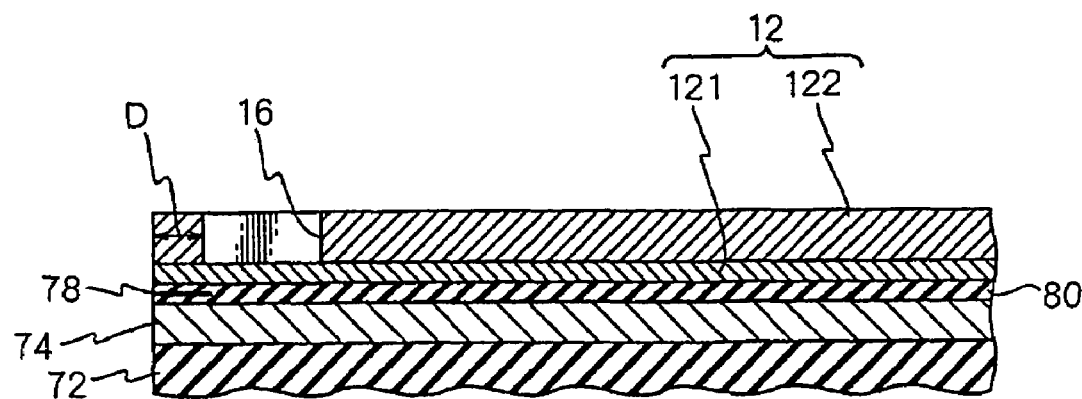
Figure 4A:
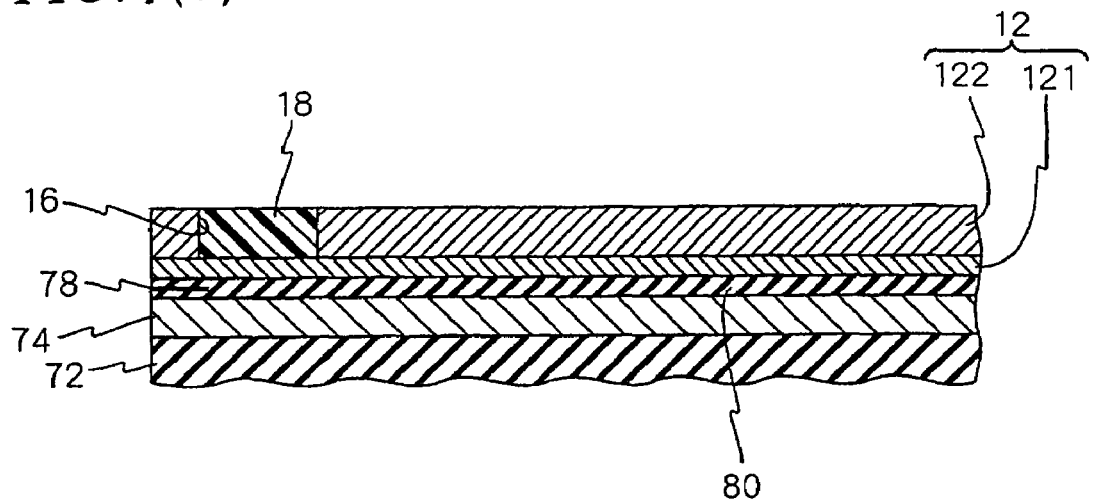
FIGS. 4(*a*) to FIG. 4(*c*) are sectional views showing a method for producing the thin-film magnetic head shown in FIG. 1, in which processes advance from FIG. 4(*a*), 4(*b*), to 4(*c*) in order.
Figure 4B:
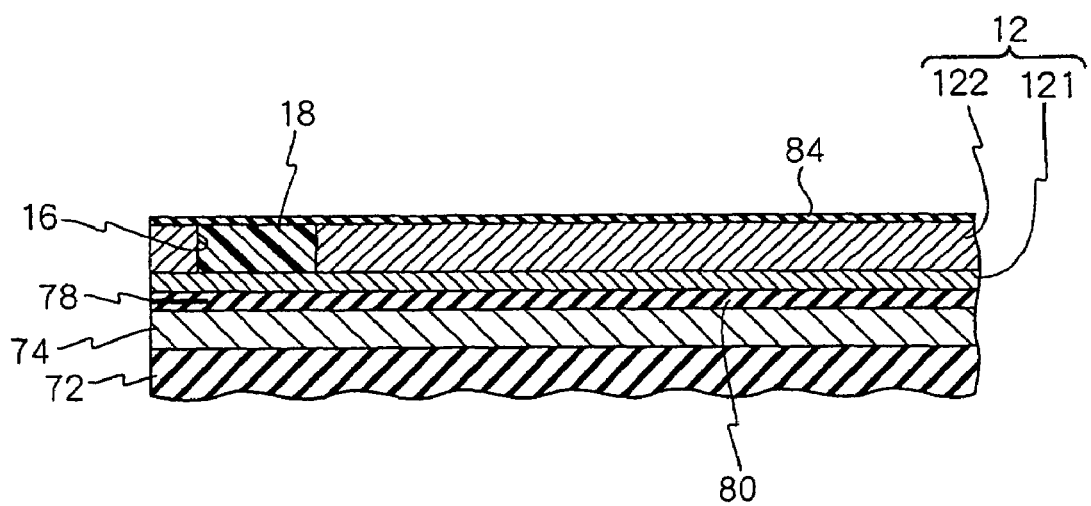
Figure 4C:
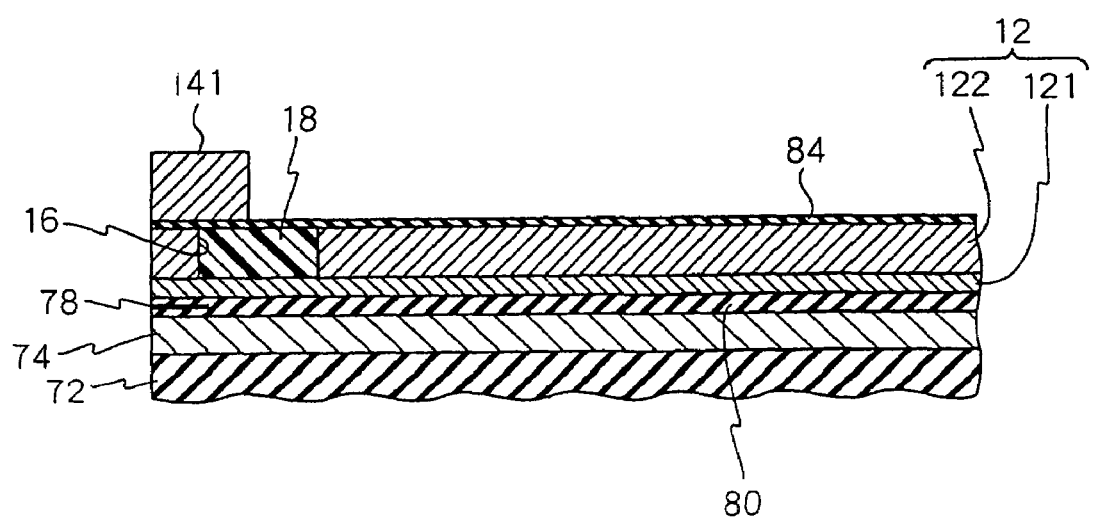
Figure 5:
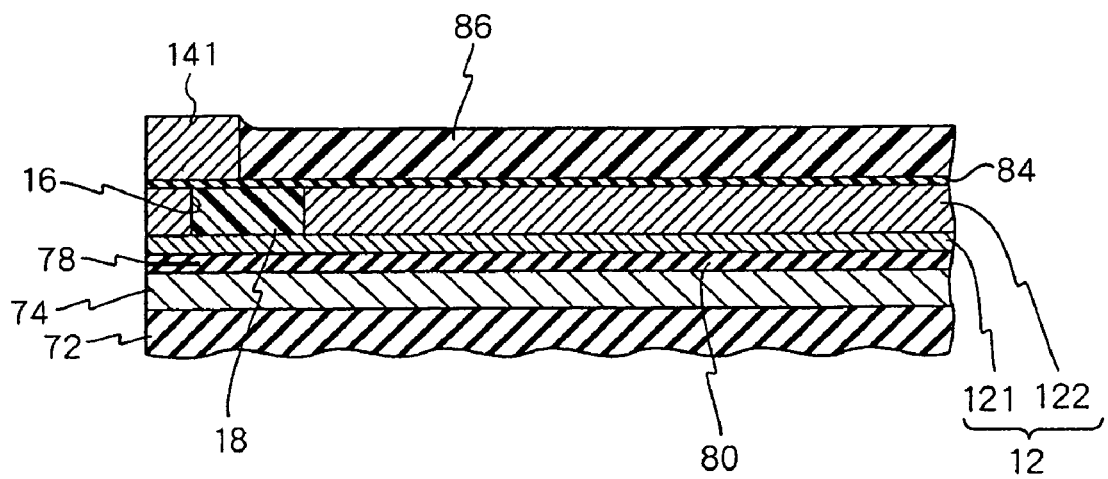
FIGS. 5(*a*) to FIG. 5(*c*) are sectional views showing a method for producing the thin-film magnetic head shown in FIG. 1, in which processes advance from FIG. 5(*a*), 5(*b*), to 5(*c*) in order.
Figure 5:
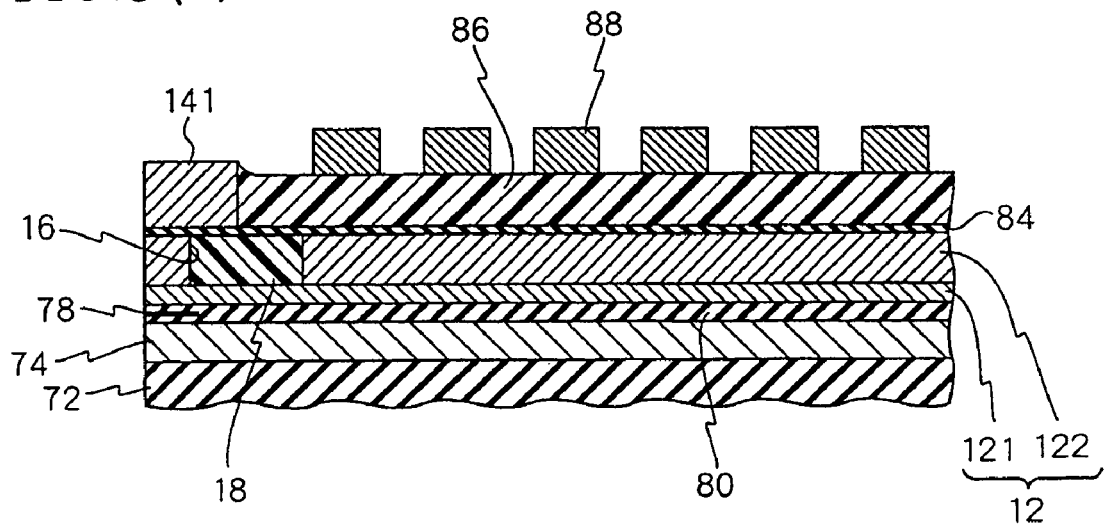
Figure 5:
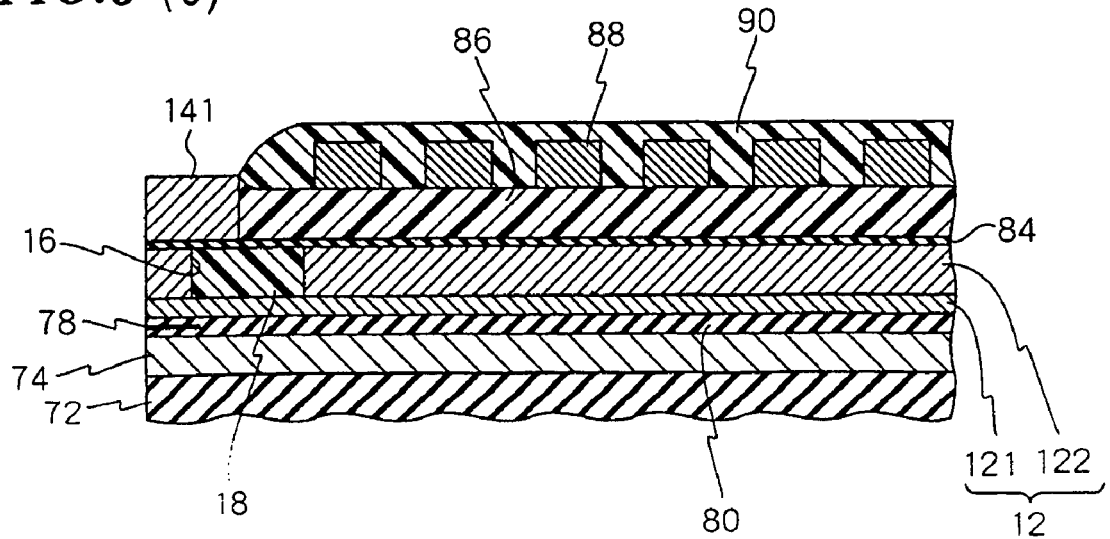

FIGS. 3 to 5 are sectional views showing a method for producing the thin-film magnetic head of FIG. 1. These sectional views show the thin-film magnetic head cut at the center of the width of the recording track of the head similar to FIG. 1. The thin-film magnetic head production method of FIG. 1 is described below by referring to FIGS. 3 to 5.

Step (a) . . . FIG. 3(a)

First, an NiFe substrate film (not illustrated) is formed on an insulating substrate 72 wherein an $Al_2O_3$ insulating layer is formed on an $Al_2O_3$—TiC ceramic substrate serving as a slider material through the sputtering method. Then, a certain resist pattern is formed for the exposing and developing process which forms a lower shielding layer 74 made of an NiFe plated film having a thickness of 2 μm through the plating method. Then, a resist frame is removed by an organic solvent to remove the NiFe substrate film through the dry etching method. Since the steps for forming and removing a plating substrate film and for removing resist are the same as explained in the above, the description of the steps for the frame plating method is omitted hereafter. Then, the lower portion of a read gap layer 80 made of $Al_2O_3$ having a thickness of 100 nm is formed into a film through the sputtering method to form an MR magnetosensitive element 78 for detecting a signal magnetic field from a magnetic storage medium. Moreover, the MR magnetosensitive element 78 is a soft adjacent layer MR element having a three-layer structure constituted of a CoZrTa layer (200 nm), Ta layer (15 nm), and NiFe layer (20 nm). Moreover, the upper portion of the read gap layer 80 made of $Al_2O_3$ having a thickness of 80 nm is formed through the sputtering method.

Step (b) . . . FIG. 3(b)

The resist frame pattern of a lower common pole layer 121 is formed in the exposing and developing process to form common pole layer 121 made of an NiFe plated film having thickness of 1 μm through the frame plating method.

Step (c) . . . FIG. 3(c)

To flatly form a rectangular concave portion 16 for specifying a gap depth D, a rectangular resist pattern is formed in the exposing and developing process to form an upper common pole layer 122 made of an NiFe plated film having a thickness of 3.0 μm through the plating method. After plating is completed, the concave portion 16 is formed by removing the rectangular resist pattern.

Step (d) . . . FIG. 4(d)

To embed a nonmagnetic body 18 made of resist in the concave portion 16, a resist pattern having a film thickness 1.5 times larger than that of the common pole layer 122 is formed in the exposing and developing process. Then, resist is softened through heat treatment at 100 to 120° C. for 30 min by using an oven or hot plate to fill the inside of the concave portion 16 with the resist. Then, the resist is further thermoset at 250 to 270° C. for 30 min. At this point of time, the upper portion of the common pole layer 122 is almost flush with the upper portion of the resist.

Step (e) . . . FIG. 4(e)

A write gap layer 84 is formed by forming an $Al_2O_3$ film having a thickness of 350 nm through the sputtering method.

Step (f) . . . FIG. 4(f)

To realize an upper pole layer 14 having a thickness of 4 μm and a track width (front-end portion width W) of 1 μm, a front end portion 141 made of an NiFe plated film is formed through the frame plating method.

Step (g) . . . FIG. 5(g)

A resist pattern is formed in the exposing and developing process to form a first flattening layer 86 having a film thickness almost equal to that of the front end portion 141. Then, the first flattening layer 86 is formed by thermosetting resist through heat treatment at 100 to 120° C. for 30 min by an oven or hot plate and further thermosetting the resist at 250 to 270° C. for 30 min.

Step (h) . . . FIG. 5(h)

A resist pattern having a predetermined shape is formed in the exposing and developing process to form a coil pattern 88 made of a Cu plated film having a thickness of 4.5 μm through the plating method.

Step (i) . . . FIG. 5(c)

A second flattening layer 90 is formed by forming a resist pattern into a predetermined shape in the exposing and developing process. Then, resist is softened through heat treatment at 100 to 120° C. for 30 min by an oven or hot plate and moreover, thermoset at 250 to 270° C. for 60 min.

Step (j) . . . FIG. 1

A resist frame pattern for forming a yoke portion 142 is formed in the exposing and developing process so that the yoke portion 142 overlaps with a joint 143 after the front end portion 141. Then, the yoke portion 142 made of an NiFe film having a thickness of 4 μm larger than that of the front end portion 141 is formed through the frame plating method.

Figure 6:
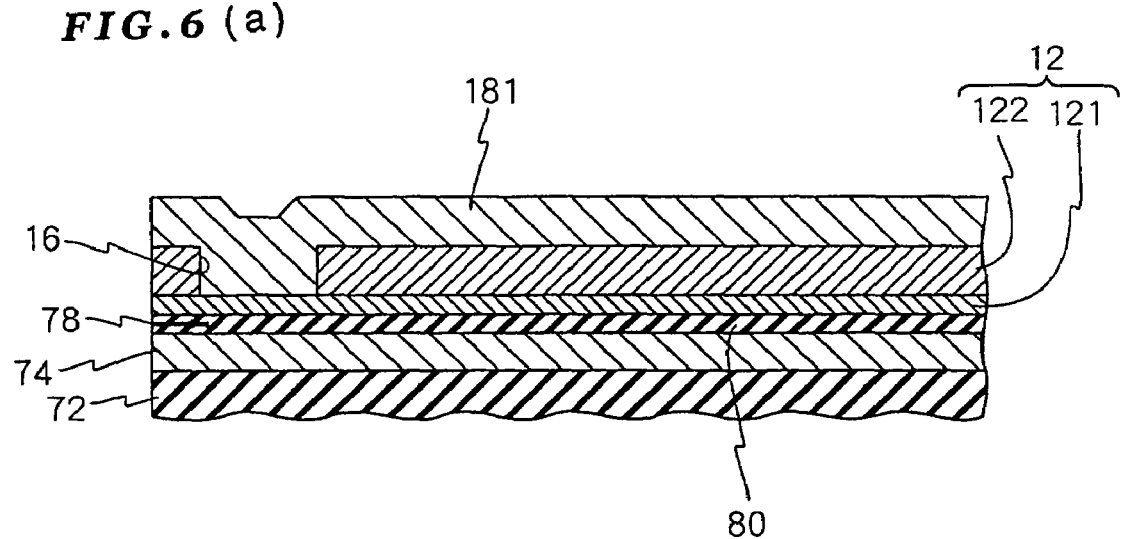
FIG. 6(*a*) and FIG. 6(*b*) are sectional views showing a method for producing a second embodiment (lap flattening) of a thin-film magnetic head of the present invention, in which processes advance from FIGS. 6(*a*) to 6(*b*) in order.
Figure 6:
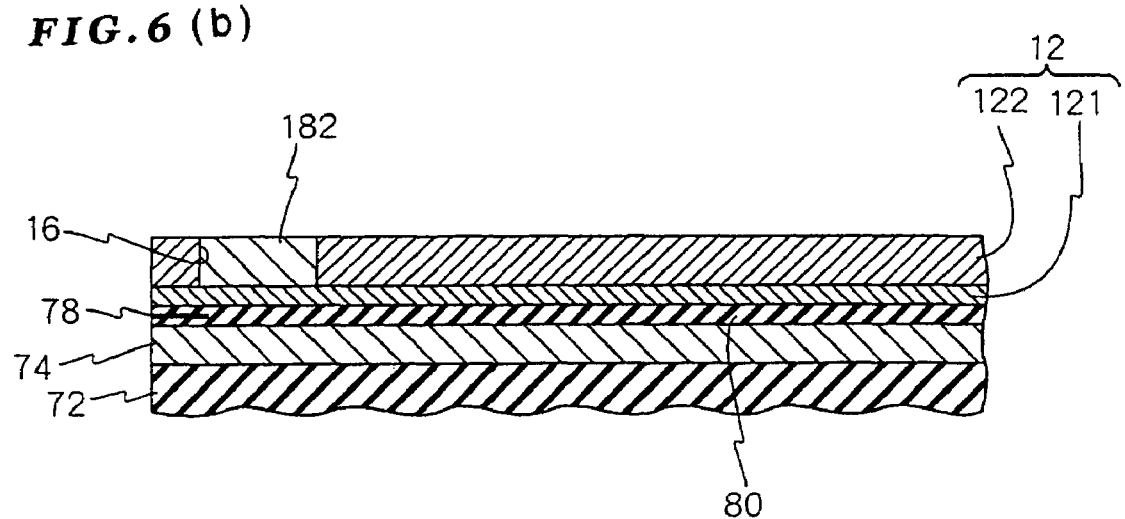

FIG. 6(a) and 6(b) are sectional views showing a second embodiment (lap flattening) of a thin-film magnetic head of the present invention. The second embodiment is described below by referring to FIGS. 6(a) and 6(b).

After the step of FIG. 3(c), an $Al_2O_3$ film 181 is formed on the common pole layer 122 through the sputtering method as shown in FIG. 6(a). Then, as shown in FIG. 6(b), the $Al_2O_3$ film 181 is polished through lapping until the surface of the common pole layer 122 appears to flatten the common pole layer 122 and form a nonmagnetic body 182. Thereby, the surface of the common pole layer 122 is flush with that of the nonmagnetic body 182. Therefore, it is possible to improve the dimensional accuracy of a resist frame pattern for forming the front end portion 141 of the upper pole layer 14 and thereby, easily decrease the track width of the upper pole layer 14.

Figure 7:
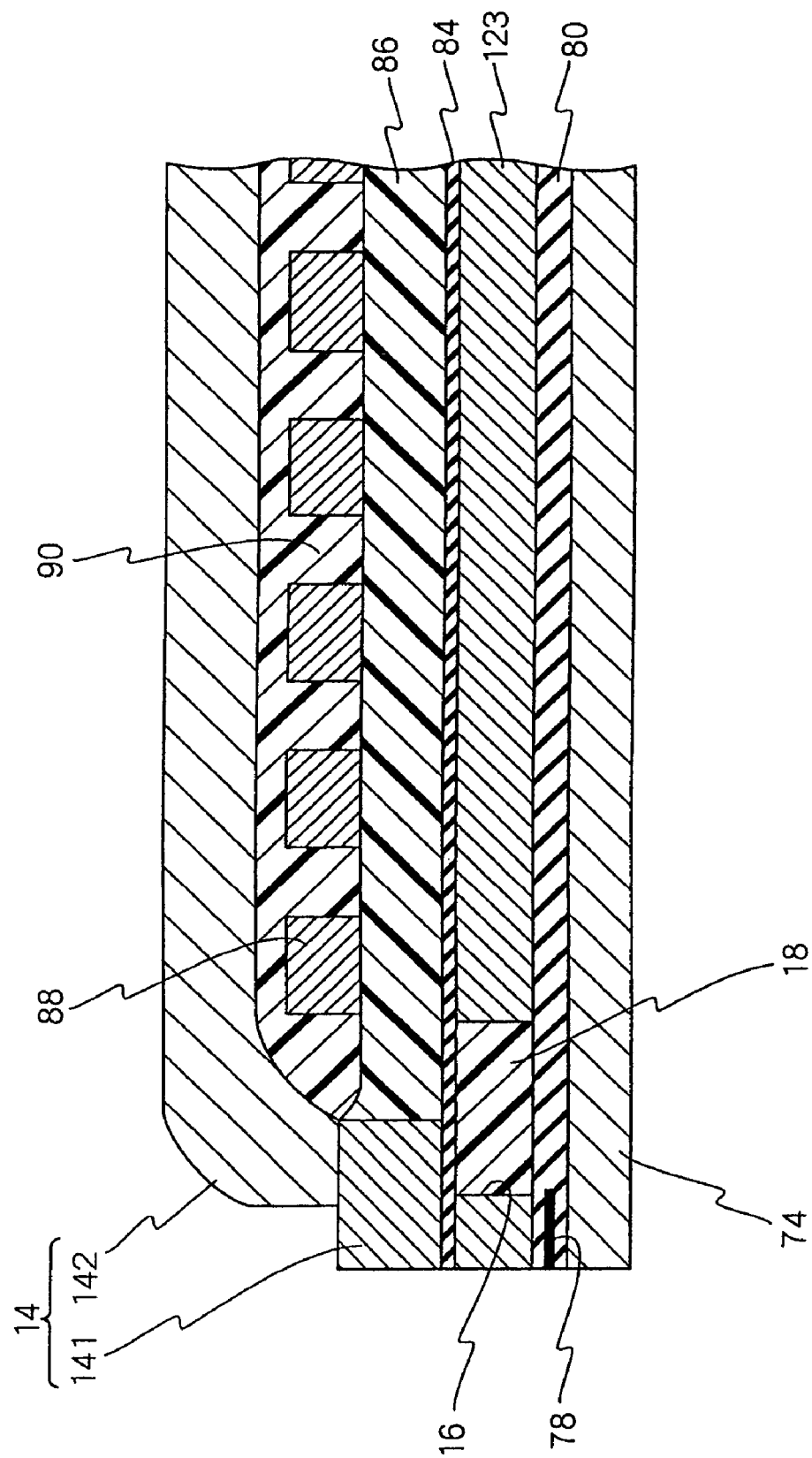
FIG. 7 is a sectional view showing a third embodiment of a thin-film magnetic head (penetrated concave portion) of the present invention.

FIG. 7 is a sectional view showing a third embodiment (penetrated concave portion) of a thin-film magnetic head of the present invention. The third embodiment is described below by referring to FIG. 7. From FIG. 7 downward, an insulating substrate 72 is omitted.

After the step in FIG. 3(a), a common pole layer 123 of only one layer is formed to form a penetrated concave portion 16 as shown in FIG. 7. Moreover, by decreasing the bottom area of the concave portion 16, it is possible to reduce a magnetic reluctance. According to this embodiment, it is possible to omit one of the processes for forming the common pole layer 123 and thereby, reducing the production cost.

Figure 8:
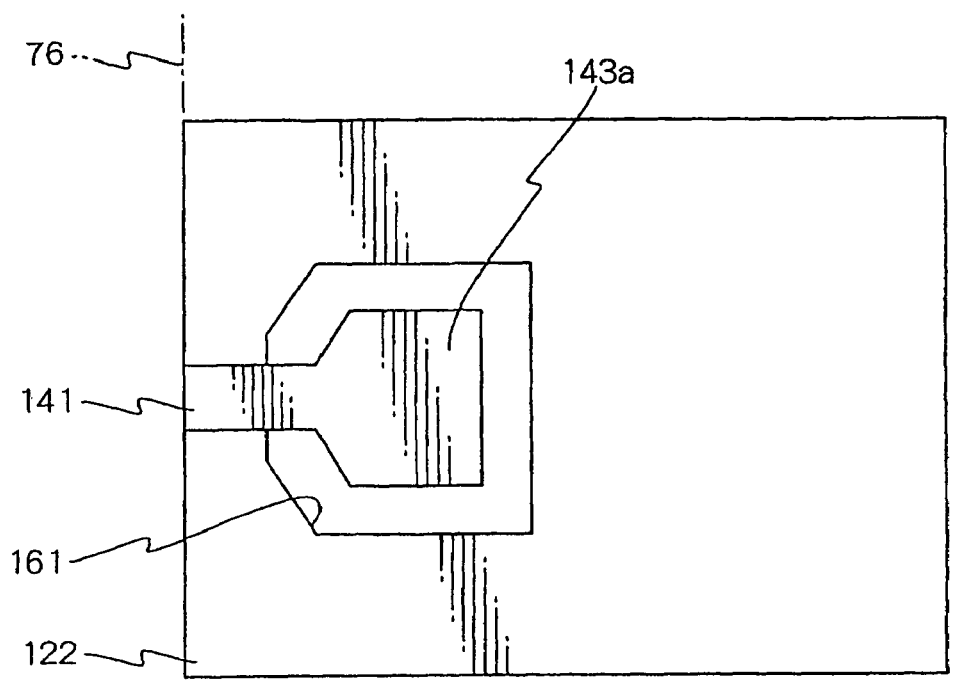
FIG. 8 is a partially-omitted top view showing a fourth embodiment (concave-portion corner shape) of a thin-film magnetic head of the present invention.

FIG. 8 is a top view showing a partially-omitted fourth embodiment (concave-portion corner shape) of a thin-film magnetic head of the present invention. The fourth embodiment is described below by referring to FIG. 8.

In the step shown in FIG. 3(c), the horizontal sectional shape of the concave portion 16 formed on the common pole layer 122 is rectangular. As for the concave portion 161 of this embodiment, however, the margin of a concave portion 161 at the ABS plane-76 side becomes narrower toward the ABS plane 76 as shown in FIG. 8. Thereby, it is possible to reduce a magnetic reluctance. In this case, it is preferable to make the size of a joint 143a smaller than the size of the concave portion 161. Thereby, leak of a magnetic flux is limited, making it possible to obtain an inductive recording head having a high magnetic recording efficiency.

Figure 9:
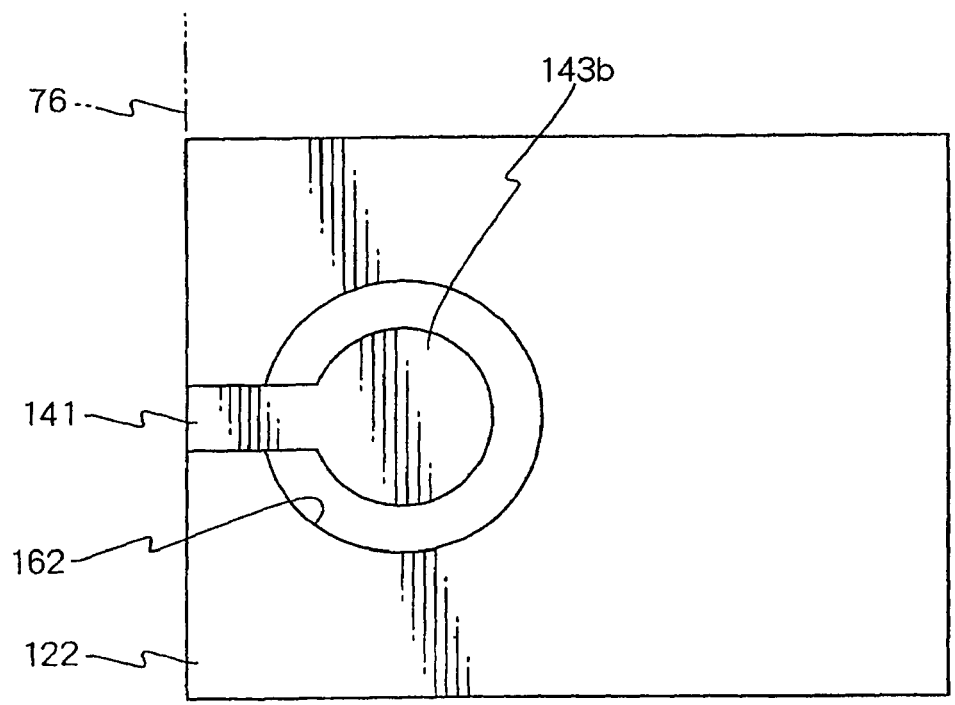
FIG. 9 is a partially-omitted top view showing a fifth embodiment (circular concave portion) of a thin-film magnetic head of the present invention.

FIG. 9 is a top view of a partially-omitted fifth embodiment (circular concave portion) of a thin-film magnetic head of the present invention. The fifth embodiment is described below by referring to FIG. 9.

The horizontal sectional shape of the concave portion 162 of this embodiment is almost circular as shown in FIG. 9. Thereby, it is possible to further reduce a magnetic reluctance. In this case, it is preferable to form a joint 143b into a circle smaller than the size of the concave portion 162. Thereby, leak of a magnetic flux can be limited, making it possible to obtain an inductive recording head having a magnetic recording efficiency.

Figure 10A:
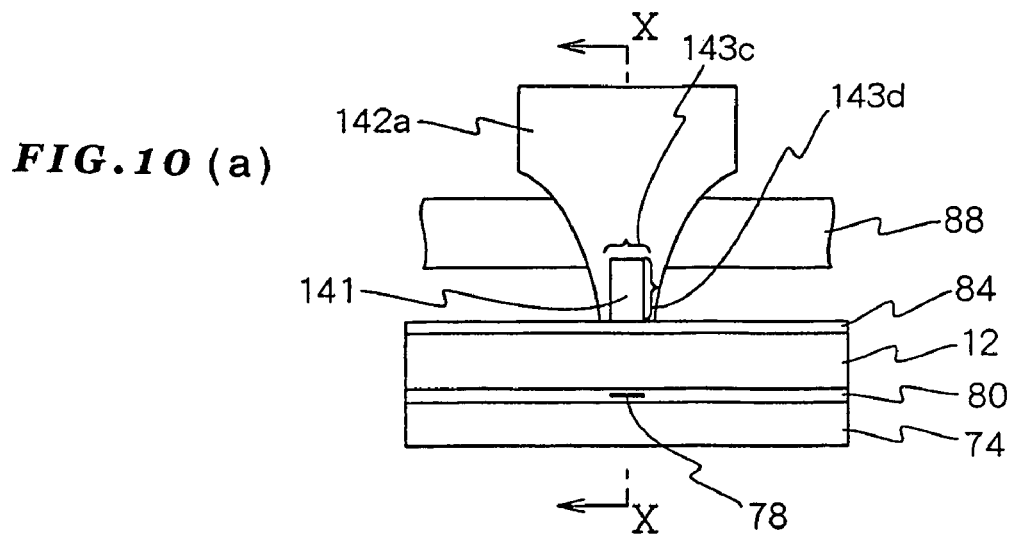
FIG. 10(*a*) to FIG. 10(*c*) show a sixth embodiment (join overlap) of a thin-film magnetic head of the present invention, in which FIG. 10(*a*) is a partially-omitted front view, FIG. 10(*b*) is a longitudinal sectional view taken along the line X—X of FIG. 10(*a*), and FIG. 10(*c*) is a partially-omitted top view.
Figure 10B:
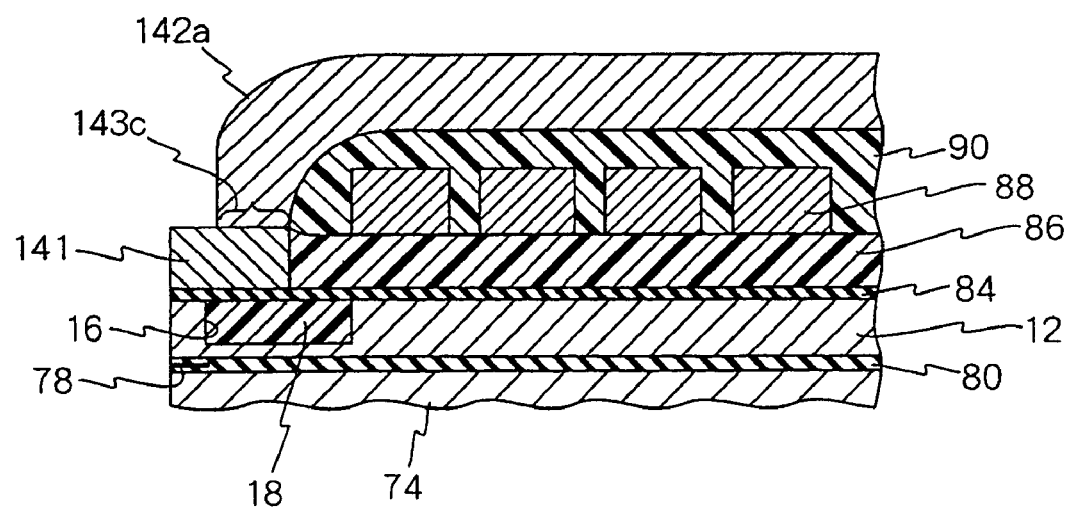
Figure 10C:
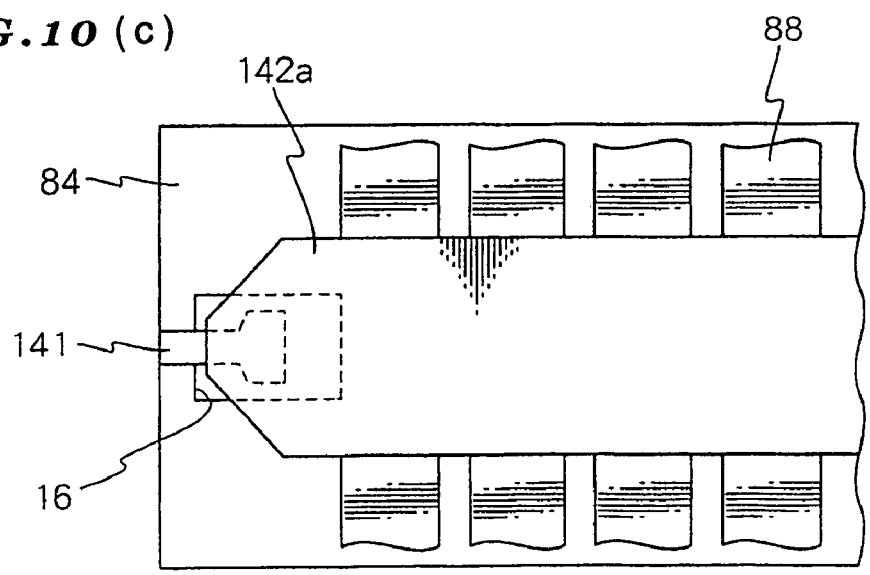

FIGS. 10(a) to 10(c) show a sixth embodiment (joint overlap) of a thin-film magnetic head of the present invention, in which FIG. 10(a) is a partially-omitted front view, FIG. 10(b) is a longitudinal sectional view taken along the line X—X of FIG. 10(a), and FIG. 10(c) is a partially-omitted top view. The sixth embodiment is described below by referring to FIGS. 10(a) to 10(c).

A yoke portion 142a is connected to a front end portion 141 through joints 143c and 143d. The joint 143c serves as upper side of the front end portion 141 and the joint 143d serves as both the lateral sides of the front end portion 141. That is, the yoke portion 142a covers the outer periphery of the front end portion 141 and also contacts a write gap layer 84. According to this embodiment, it is possible to reduce a reluctance at a joint because the contact area at the joint is large. Moreover, there is a sufficient allowance for the connection accuracy for connecting the yoke portion 142a with the front end portion 141.

Figure 11A:
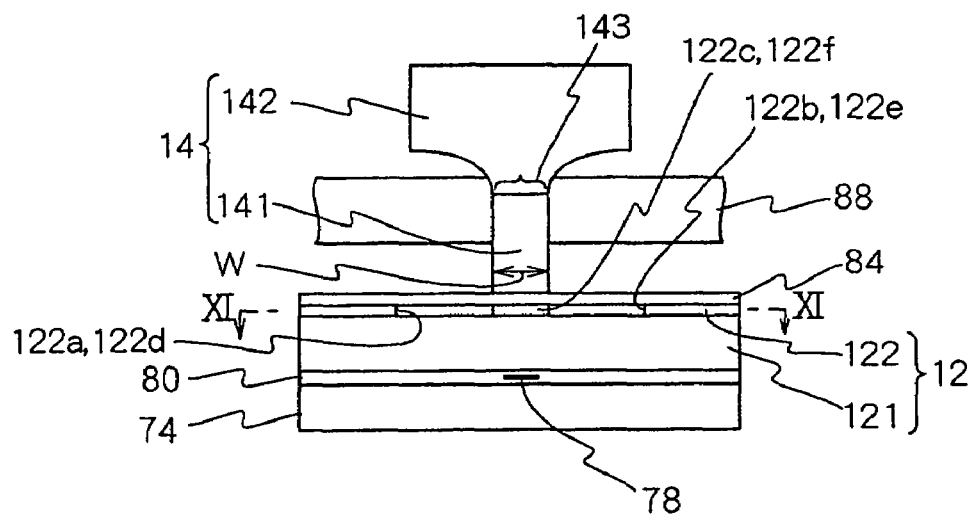
FIG. 11(*a*) to FIG. 11(*c*) show a seventh embodiment (common pole layer trim) of a thin-film magnetic head of the present invention, in which FIG. 11(*a*) is a partially-omitted front view, FIG. 11(*b*) is a transverse sectional view taken along the line XI—XI of FIG. 11(*a*), and FIG. 11(*c*) is a transverse sectional view taken along the line XI—XI of FIG. 11(*a*)
Figure 11B:
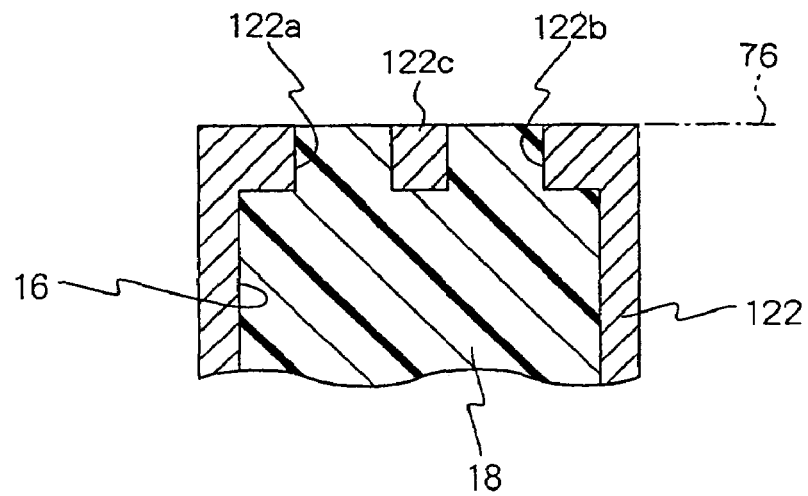
Figure 11C:
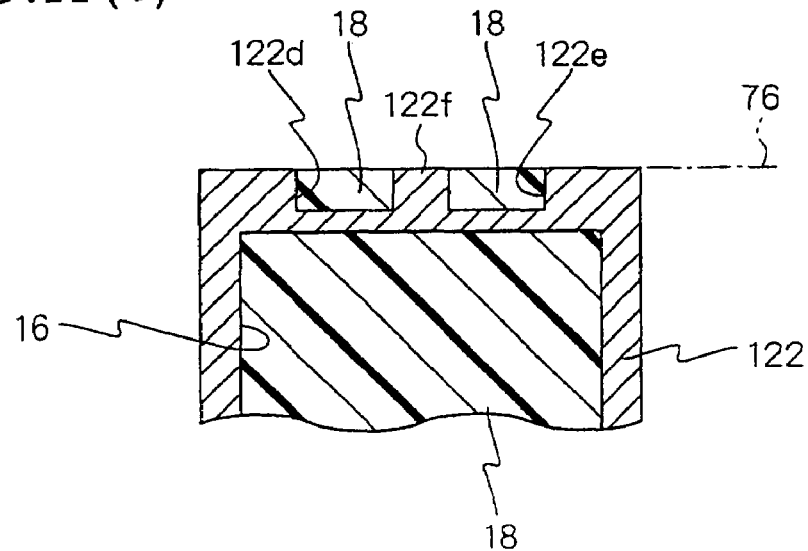

FIGS. 11(a) to 11(c) show a seventh embodiment (common pole layer trim) of a thin-film magnetic head of the present invention, in which FIG. 11(a) is a partially-omitted front view, FIG. 11(b) is a transverse sectional view taken along the line XI—XI of FIG. 11(a), and FIG. 11(c) is a transverse sectional view taken along the line XI—XI of FIG. 11(a). The seventh embodiment is described below by referring to FIG. 11(a) to 11(c).

As for this embodiment, the whole or a part of a common pole layer 122 extending from the margin of a concave portion 16 at the ABS plane-76 side up to the ABS plane 76 is removed except a portion facing a front end portion 141. FIG. 11(b) shows the first case of this embodiment, in which vacancies 122a and 122b from which the common pole layer 122 is removed and a front end portion 122c constituted of the remaining common pole layer 122 are formed. The vacancies 122a and 122b reach the margin of the concave portion 16 at the ABS plane-76 side from the ABS plane 76. FIG. 11(c) shows the second case of this embodiment, in which vacancies 122d and 122e from which the common pole layer 122 is removed and a front end portion 122f constituted of the remaining common pole layer 122 are formed. The vacancies 122d and 122e are formed on the ABS plane 76 but they do not reach the margin of the concave portion 16 at the ABS plane-76 side. According to this embodiment, it is possible to minimize a recording magnetic field to spread across the track-width-direction. Therefore, it is possible to improve the recording-track width density. Moreover, vacancies 122a, 122b, 122d, and 122e are filled with a nonmagnetic body 18 similarly to the case of the concave portion 16. The vacancies 122a, 122b, 122c, 122d, 122e, compensate for an efficiency change due to the concave portion.

Figure 12:
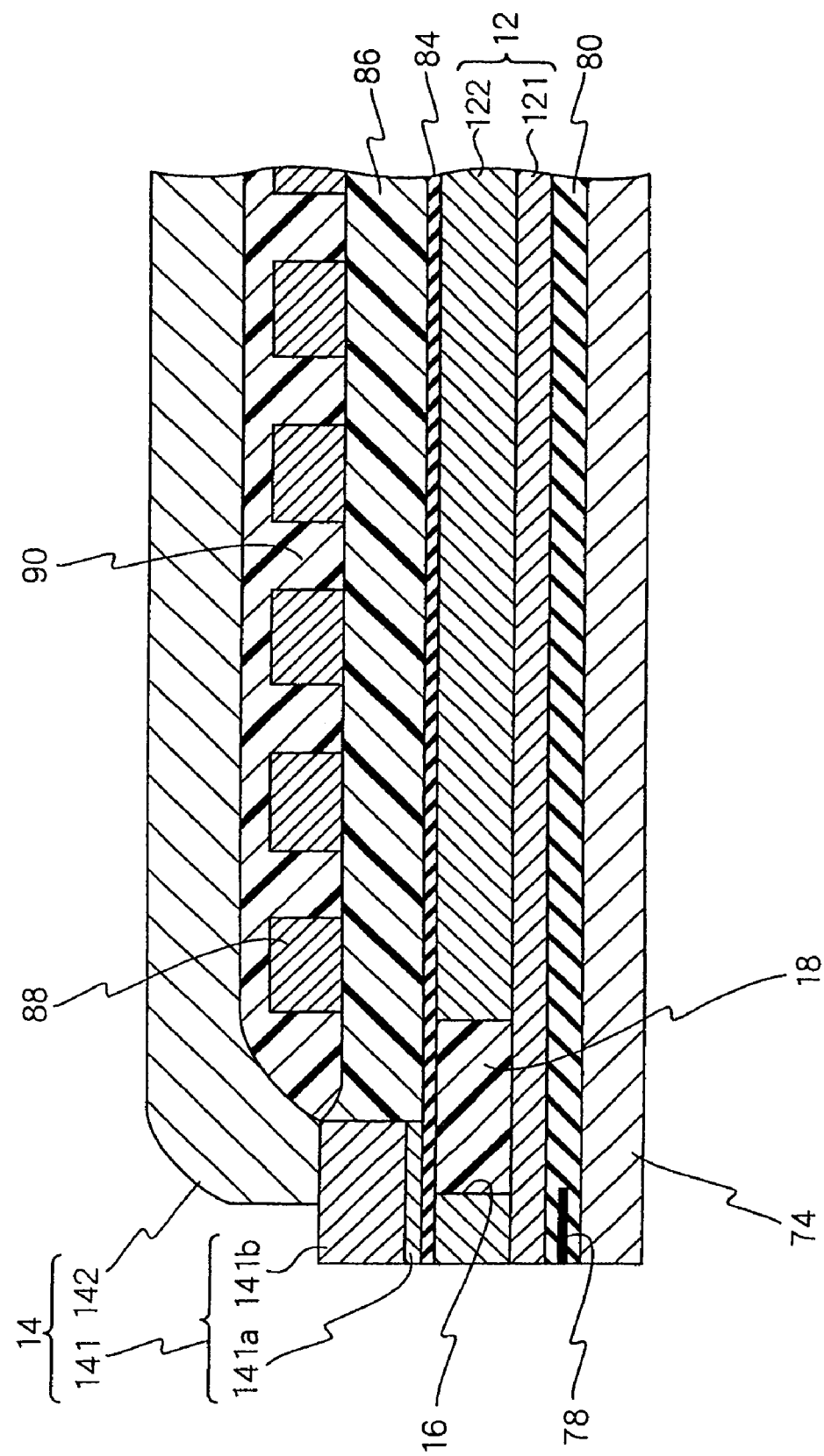
FIG. 12 is a sectional view showing an eighth embodiment (high-Bs material: a part of upper-pole-layer front end portion) of a thin-film magnetic head of the present invention.

FIG. 12 is a sectional view showing an eighth embodiment (high-Bs material: a part of upper-pole-layer front end portion) of a thin-film magnetic head of the present invention. The eighth embodiment will be described below by referring to FIG. 12.

In recent years, the Hc of a magnetic storage medium has been raised because the density of a magnetic head has been raised. Either of CoZrTa (Bs=1.4 to 1.6 T) and CoNiFe (Bs=1.8 to 2.1 T) is used as a high-Bs material of a recording pole capable of full saturation recording of data in a high-Hc medium. These high-Bs materials have a Bs of 1.4 to 2.1 T though a normal magnetic material NiFe has a Bs of 1.0 T. Hereafter, a high-Bs material is generally referred to as a material having a Bs of 1.4 to 2.1 T.

As for this embodiment, a front end portion 141 is formed into a laminated structure constituted of a front-end lower side portion 141a and a front-end upper side portion 141b and the front-end lower side portion 141a at the write gap layer-84 side is formed by using a high-Bs material through the plating method or sputtering method. When using the plating method, CoNiFe of 0.3 μm and NiFe of 2.7 μm are continuously plated by using a plating frame pattern which is also used in the plating of a high-Bs material of the front-end lower side portion 141a and NiFe plating of the front-end upper side portion 141b. When using the sputtering method, a cover resist pattern is formed on portions other than the portion on which the front-end lower side portion 141a is formed in the exposing and developing process and then, a CoNiFe film of 0.3 μm is formed in the sputtering process. Then, the front-end lower side portion 141a is formed by removing the cover resist pattern with an organic solvent. Then, the front-end upper side portion 141b made of NiFe of 2.7 μm is formed through the frame plating method. According to this embodiment, because data can be fully saturation recorded in a high-Hc medium, it is possible to provide a magnetic head suitable for narrow track recording. Moreover, the advantage obtained by using a high-Bs material is the same hereafter.

Figure 13:
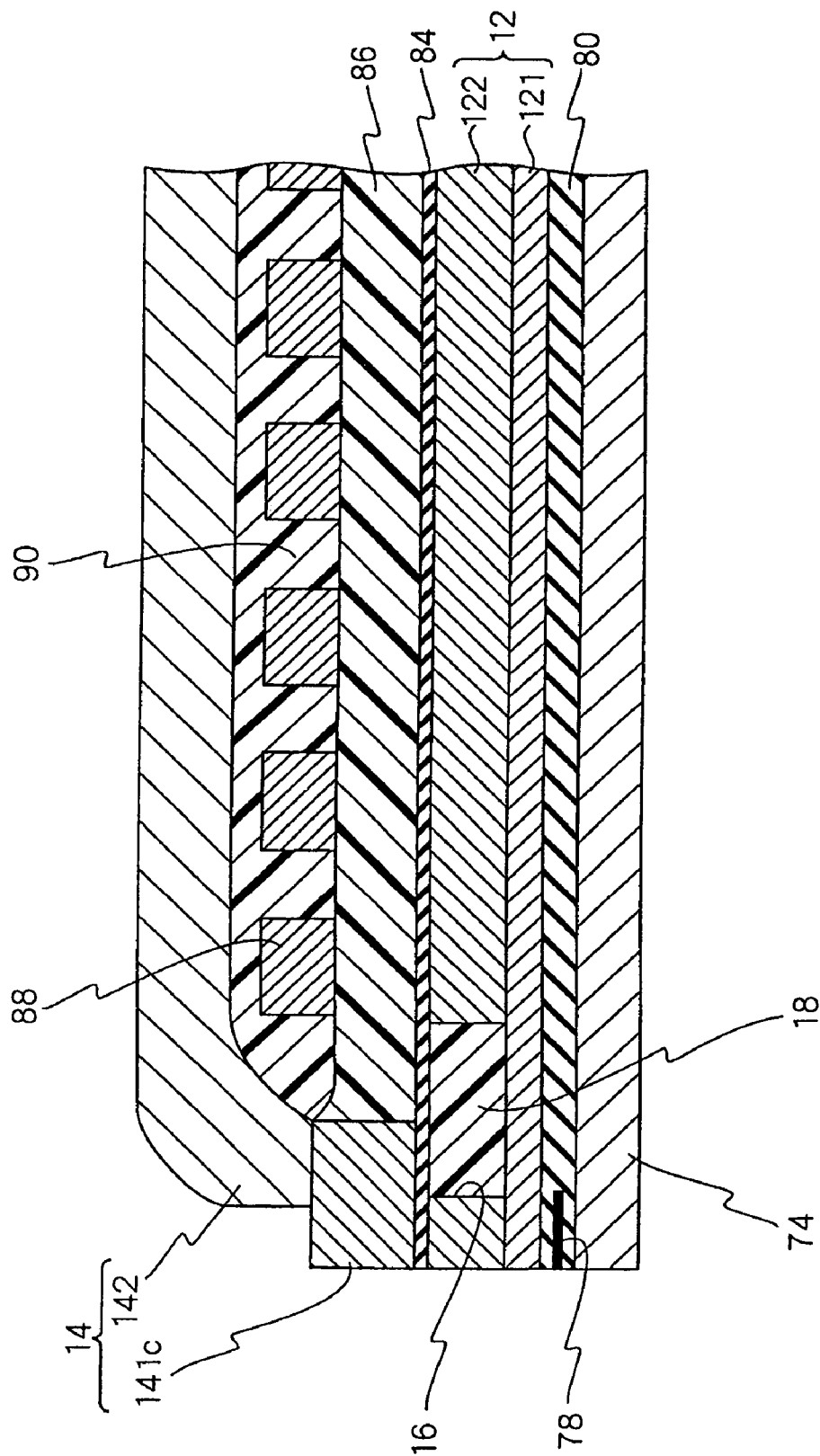
FIG. 13 is a sectional view showing a ninth embodiment (high-Bs material: the whole of upper pole layer) of a thin-film magnetic head of the present invention.

FIG. 13 is a sectional view showing a ninth embodiment (high-Bs material: the whole of upper pole layer) of a thin-film magnetic head of the present invention. The ninth embodiment is described below by referring to FIG. 13.

As for this embodiment, the whole front end portion 141c of an upper pole layer 14 is made of a high-Bs material. According to this embodiment, it is possible to increase the magnetic recording capacity because the whole front end portion 141c is made of the high-Bs material.

Figure 14:
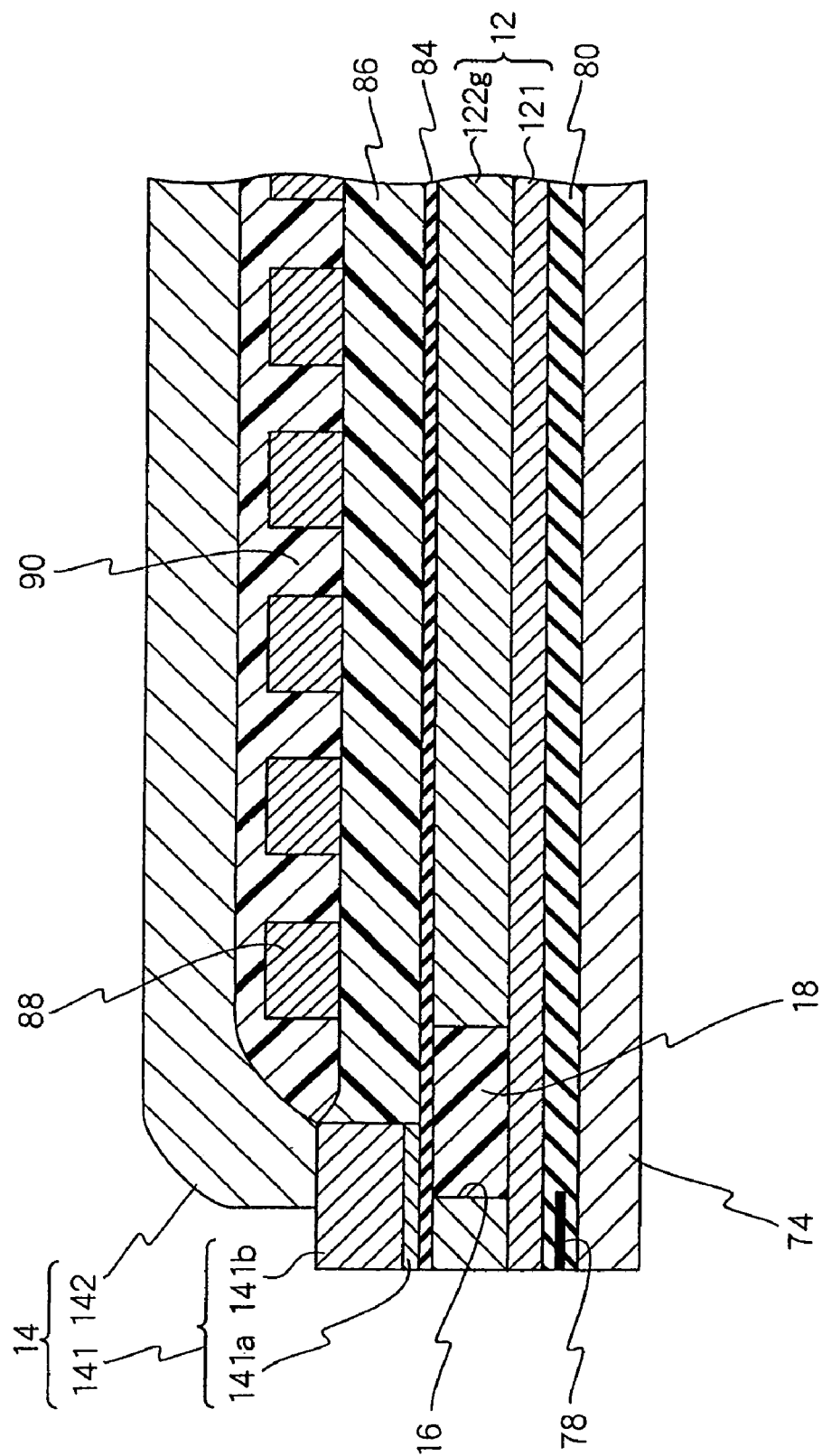
FIG. 14 is a sectional view showing a tenth embodiment (high-Bs material: upper common pole layer) of a thin-film magnetic head of the present invention.

FIG. 14 is a sectional view showing a tenth embodiment (high-Bs material: upper common pole layer) of a thin-film magnetic head of the present invention. The tenth embodiment is described below by referring to FIG. 14.

As for this embodiment, a common pole layer 122g is formed by using a high-Bs material through the plating method or sputtering method. A front-end lower side portion 141a and a front-end upper side portion 141b are formed through the method described for the eighth embodiment. By using a high-Bs material for the common pole layer 122g and front end portion 141, it is possible to improve the overwrite characteristic.

Figure 15:
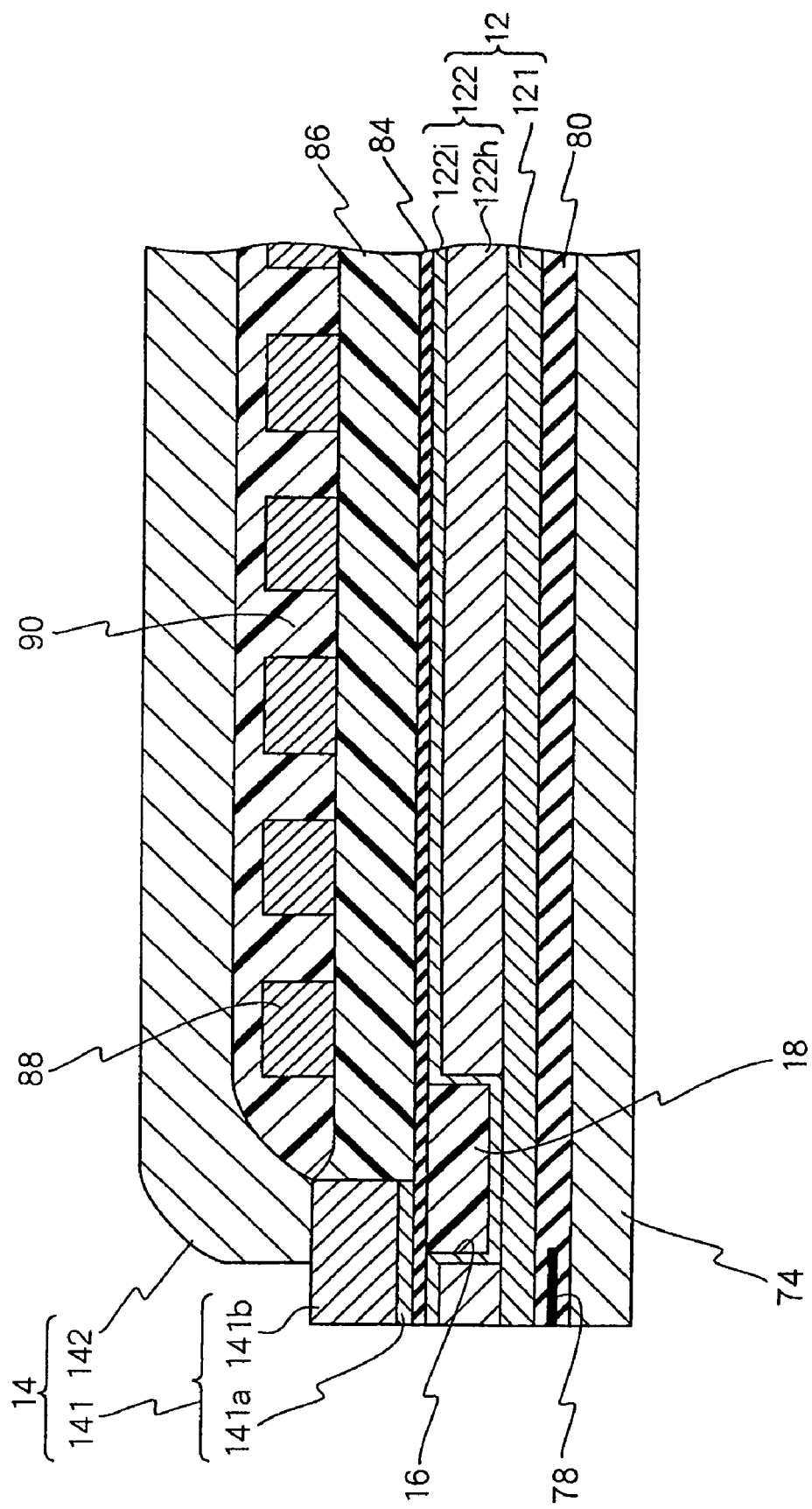
FIG. 15 is a sectional view showing an eleventh embodiment (high-Bs material: common pole layer, present at lateral side and bottom side of concave portion) of a thin-film magnetic head of the present invention.

FIG. 15 is a sectional view showing an eleventh embodiment (high-Bs material: common pole layer, present at inner sides of concave portion) of a thin-film magnetic head of the present invention. The eleventh embodiment is described below by referring to FIG. 15.

As for this embodiment, a common pole layer 122 has a two-layer structure constituted of a common-pole-layer lower side 122h and a common-pole-layer upper side 122i. The common-pole-layer upper side 122i is formed through the plating method or sputtering method by using a high-Bs material after forming a concave portion 16, besides forming the high Bs material inner sides of the concave portion 16. A front-end lower side portion 141a and a front-end upper side portion 141b are formed through the method described in the eighth embodiment. According to this embodiment, a magnetic flux is not stopped in the concave portion 16 but it efficiently flows because the lateral and bottom sides of the concave portion 16 and the front-end lower side portion 141a are continuously made of a high-Bs material.

Figure 16:
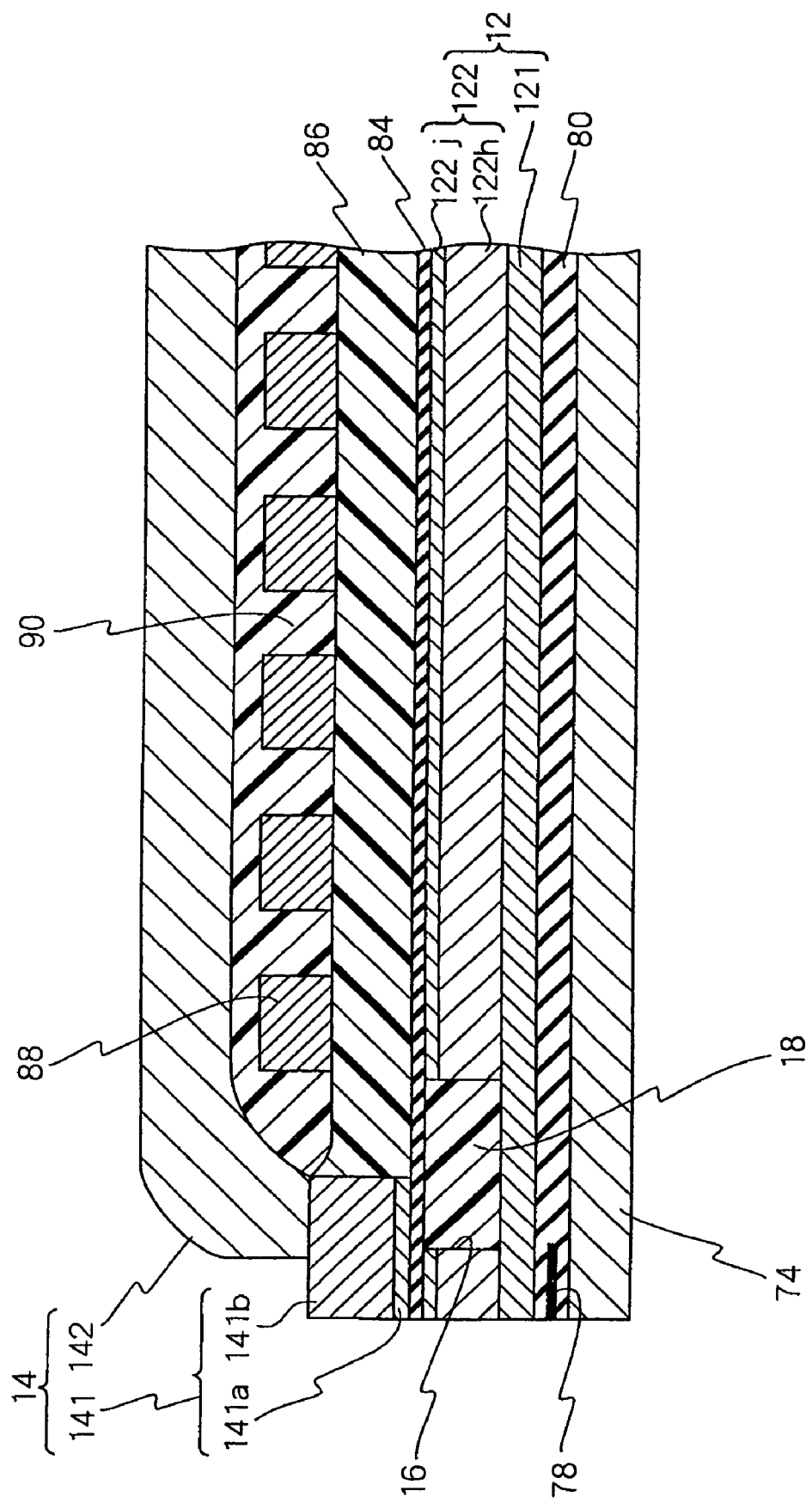
FIG. 16 is a sectional view showing a twelfth embodiment (high-Bs material: a common pole layer, absent inner sides of the concave portion) of a thin-film magnetic head of the present invention.

FIG. 16 is a sectional view showing a twelfth embodiment (high-Bs material: common pole layer, absent inner sides of the concave portion) of a thin-film magnetic head of the present invention. The twelfth embodiment is described below by referring to FIG. 16.

As for this embodiment, a common pole layer 122 has a two-layer structure constituted of a common-pole-layer lower side 122h and a common-pole-layer upper side 122j. The common-pole-layer lower side 122h is made of NiFe having a film thickness of 2.7 µm and the common-pole-layer upper side 122j is made of a high-Bs material having a film thickness of 300 nm, and they are continuously formed through the plating method. Moreover, a front-end lower side portion 141a and a front-end upper side portion 141b are formed through the method described in the eighth embodiment. According to this embodiment, the common-pole-layer lower side 122h and the common-pole-layer upper side 122j have the same resist frame pattern, making it possible to form the high-Bs common-pole-layer upper side 122j in the plating process without forming a new resist frame pattern. Therefore, the production cost is reduced.

Figure 17:
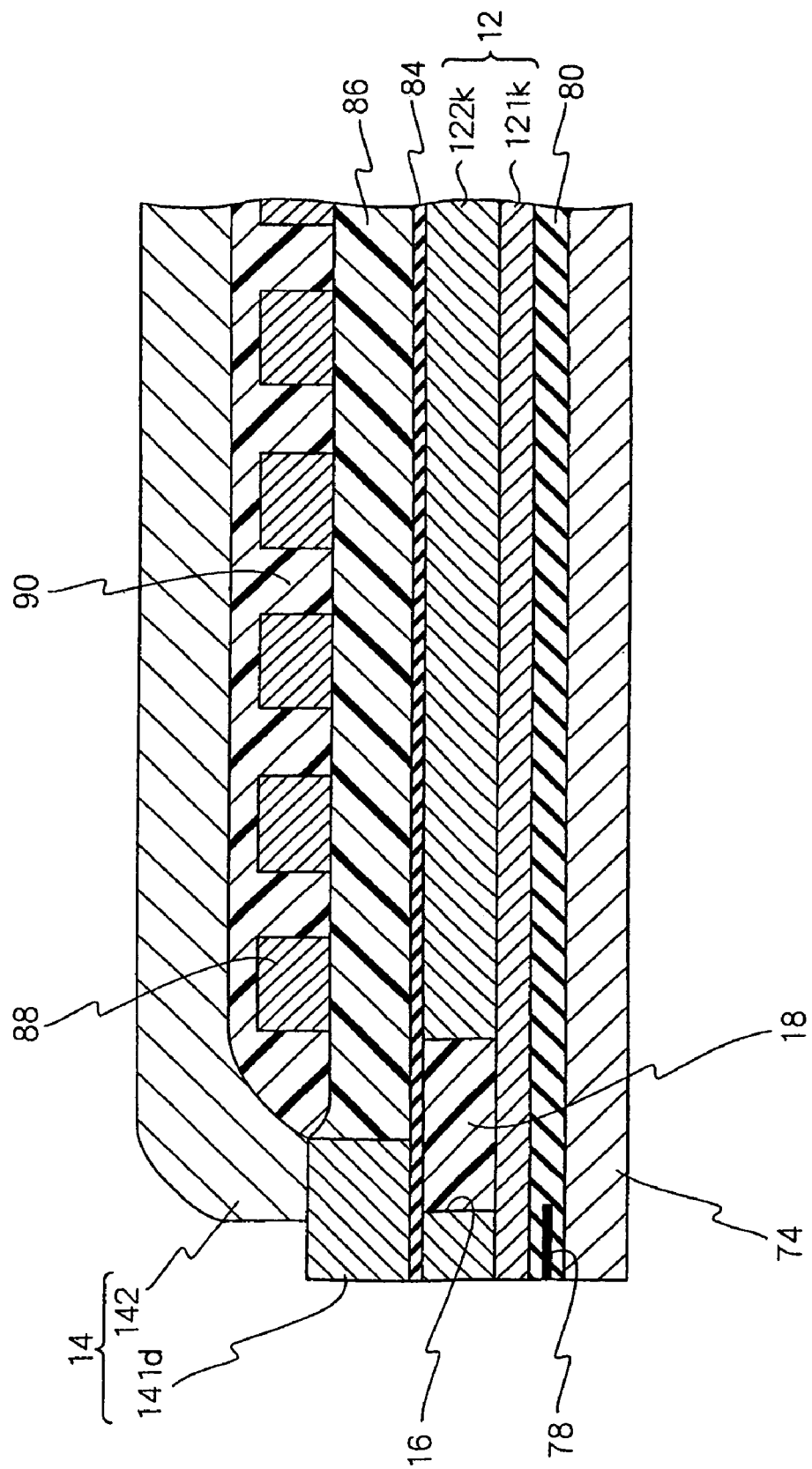
FIG. 17 is a sectional view showing a thirteenth embodiment (high-Bs material: the whole) of a thin-film magnetic head of the present invention.

FIG. 17 is a sectional view showing a thirteenth embodiment (high-Bs material: the whole) of a thin-film magnetic head of the present invention. The thirteenth embodiment is described below by referring to FIG. 17.

As for this embodiment, common pole layers 121k and 122k and a front end portion 141d are all made of a high-Bs material through the plating method or sputtering method. According to this embodiment, it is possible to increase the magnetic recording capacity.

Figure 18:
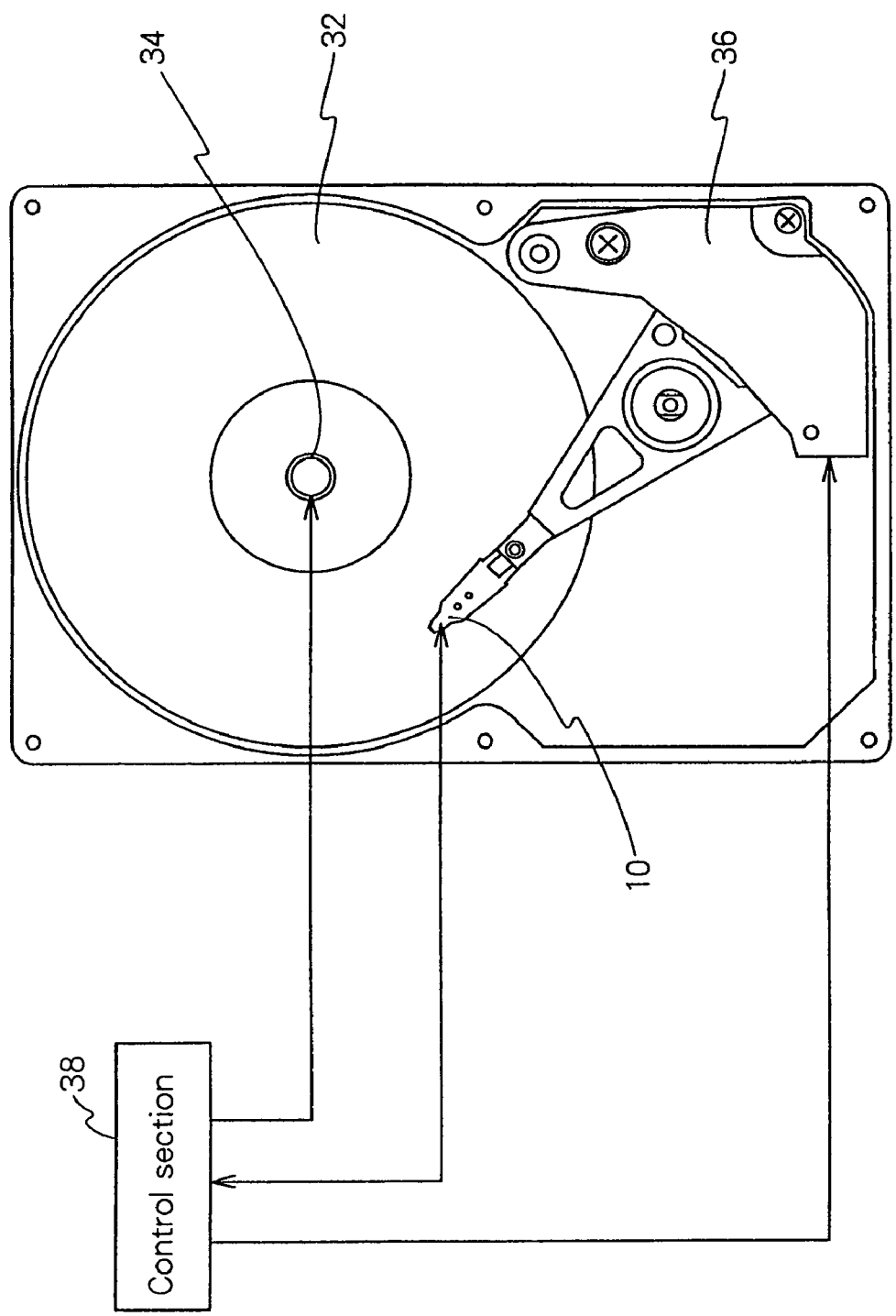
FIG. 18 is a schematic block diagram showing an embodiment of a magnetic storage apparatus using a thin-film magnetic head of the present invention.
Figure 19:
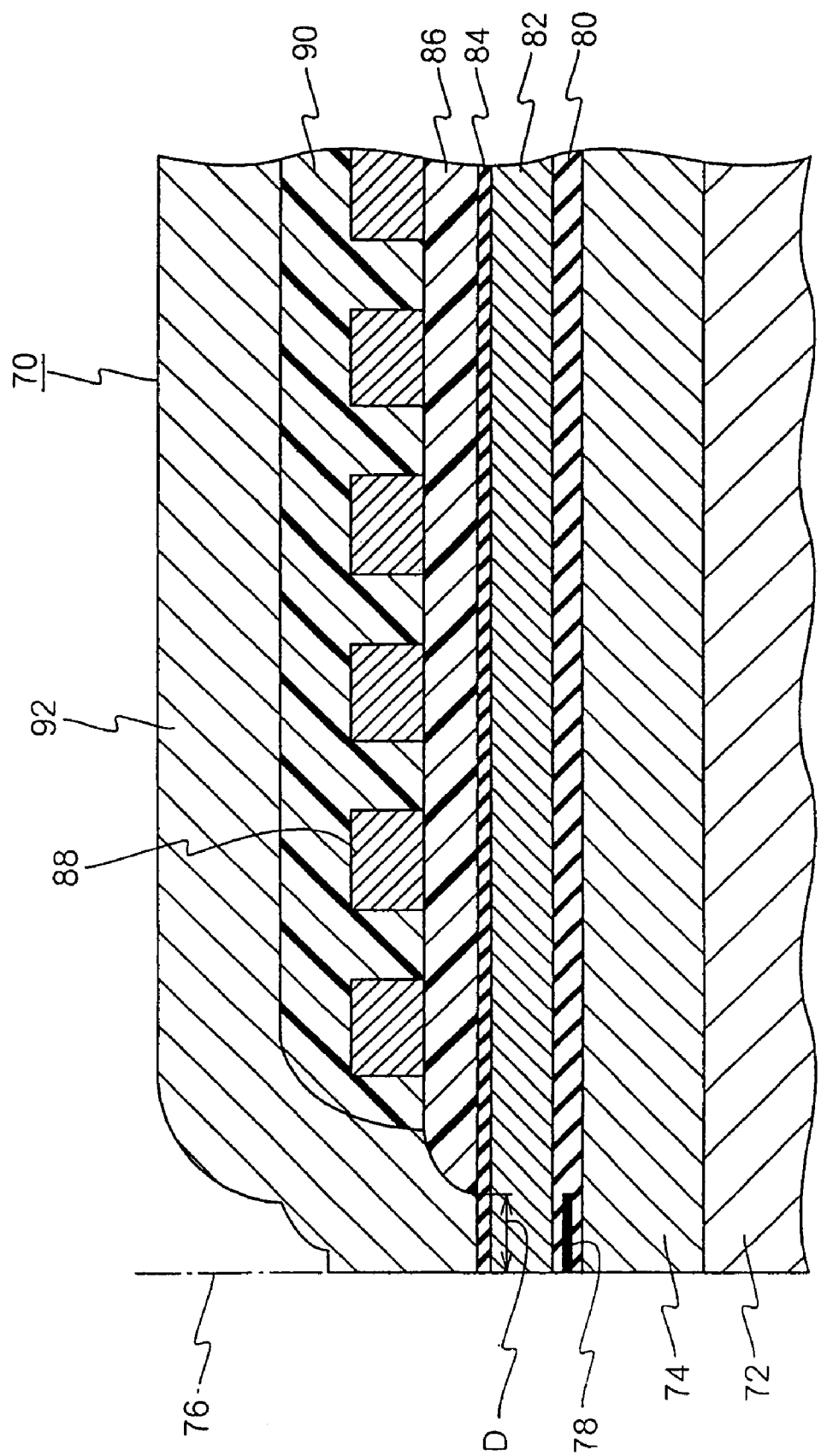
FIG. 19 is a sectional view showing a conventional thin-film magnetic head.

FIG. 18 is a schematic block diagram showing an embodiment of a magnetic storage apparatus using a thin-film magnetic head of the present invention. The embodiment is described below by referring to FIG. 18.

The magnetic storage apparatus 30 of this embodiment is constituted of the thin-film magnetic head 10 of the first embodiment, a magnetic storage medium 32, a spindle motor 34 for rotating the magnetic storage medium 32, a voice coil motor 36 for moving the thin-film magnetic head 10 on the magnetic storage medium 32, and a control section 38 to be operated in accordance with a command from a not-illustrated host system. The control section 38 drives the spindle motor 34 and voice coil motor 36 and moreover, records or reproduces data in or from the magnetic storage medium 32 by the thin-film magnetic head 10.

Because the magnetic recorder of this embodiment uses the thin-film magnetic head 10, the recording track width is 1.2 µm or less. A recording density that can be realized by the track width is 4 Gbits/(inch) 2 or more. Therefore, by using a 3.5"-diameter disk, a magnetic recorder having a high recording density of 5 Gbytes/disk or more can easily be provided.

Moreover, it is needless to say that the present invention is not restricted to the above embodiments. For example, a thin-film magnetic head of the present invention can use not only an MR-inductive composite-type thin-film magnetic head but also a thin-film magnetic head constituted of only the inductive type or a composite-type thin-film magnetic head constituted of a reproducing head other than the MR type and an inductive-type recording head. Moreover, a lower shielding layer can use not only an NiFe plated film but also a FeAlSi, CoZrTa, or FeTaN sputtered film.

According to a thin-film magnetic head of the present invention, a concave portion is formed on a lower pole layer or common pole layer separated from an ABS plane, the concave portion is filled with a nonmagnetic body, and a gap depth is determined by the concave portion. Therefore, the gap depth is not determined by the distance from the ABS plane up to the front end of a first flattening layer. Therefore, it is possible to make the first flattening layer sufficiently separated from the ABS plane, making it possible for the film thickness of a resist frame pattern for forming the front end portion of an upper pole layer not to increase by the height difference of the first flattening layer or making it possible not to be overexposed by the light reflected from the first flattening layer. Therefore, it is possible to accurately decrease the gap depth and front-end portion width.

For example, it is possible to decrease the film thickness of a resist frame pattern for forming the front end portion of the upper pole layer up to approx. 5 µm besides being able to form the pattern on a flat portion. As a result, it is possible to decrease the recording track width determined by the front end portion width of the upper pole layer to 1.0 µm or less by applying a stepper system (reduced projection developing system) using the i-ray of Hg for the present invention, The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-158974 (Filed on Jun. $8_{th}$, 1998) including specification, claims, drawings and summary are incorporated herein by reference in its entirety.

What is claimed is:

1. A thin-film magnetic head comprising:
   a lower pole layer and a write gap layer;
   a first flattening layer, a coil pattern layer, and a second flattening layer which are laminated in order on the write gap layer excluding the vicinity of an ABS plane;
   an upper pole layer laminated on the write gap layer at least nearby the ABS plane;
   a concave portion which is formed on the lower pole layer at a position separate from the ABS, and which is filled with a nonmagnetic body, and determines a gap depth between the upper pole layer and the lower pole layer; and
   a vacancy formed in the lower pole layer and reaching a margin of the concave portion.

2. The thin-film magnetic head as claimed in claim 1, wherein the vacancy reaches a margin of the concave portion at an ABS plane side which becomes narrower toward the ABS plane.

3. The thin-film magnetic head as claimed in claim 1, wherein the vacancy reaches a margin of the concave portion which is almost circular.

4. The thin-film magnetic head as claimed in claim 1, wherein the vacancy compensates for an efficiency change due to the concave portion.

5. The thin-film magnetic head comprising:
   a lower pole layer and a write gap layer;
   a first flattening layer, a coil pattern layer, and a second flattening layer which are laminated in order on the write gap layer excluding the vicinity of an ABS plane;
   an upper pole layer laminated on the write gap layer at least nearby the ABS plane;
   a concave portion which is formed on the lower pole layer at a position separate from the ABS, and which is filled with a nonmagnetic body, and determines a gap depth between the upper pole layer and the lower pole layer; and
   a vacancy formed in a yoke portion of the upper pole layer contacted with the write gap layer, and reaches an outer contour of a front end of the upper pole layer.

6. The thin-film magnetic head as claimed in claim 5, wherein the vacancy compensates for an efficiency change due to the concave portion.

7. The thin-film magnetic head comprising:
   a lower pole layer and a write gap layer;
   a first flattening layer, a coil pattern layer, and a second flattening layer which are laminated in order on the write gap layer excluding the vicinity of an ABS plane;
   an upper pole layer laminated on the write gap layer at least nearby the ABS plane;
   a concave portion which is formed on the lower pole layer at a position separate from the ABS, and which is filled with a nonmagnetic body, and determines a gap depth between the upper pole layer and the lower pole layer; and
   a vacancy formed in a part of the lower pole layer in which a front end reaches the ABS plane, along an inner wall of the concave portion.

8. The thin-film magnetic head as claimed in claim 7, wherein the vacancy compensates for an efficiency change due to the concave portion.

* * * * *